US012063972B2

(12) United States Patent
Emmett et al.

(10) Patent No.: US 12,063,972 B2
(45) Date of Patent: Aug. 20, 2024

(54) AEROSOL-GENERATING SYSTEM COMPRISING VENTURI ELEMENT

(71) Applicant: Philip Morris Products S.A., Neuchatel (CH)

(72) Inventors: Robert Emmett, Neuchatel (CH); Eva Saade Latorre, Colombier (CH)

(73) Assignee: Philip Morris Products S.A., Neuchatel (CH)

( * ) Notice: Subject to any disclaimer, the term of this patent is extended or adjusted under 35 U.S.C. 154(b) by 541 days.

(21) Appl. No.: 17/299,162

(22) PCT Filed: Dec. 4, 2019

(86) PCT No.: PCT/EP2019/083715

§ 371 (c)(1),
(2) Date: Jun. 2, 2021

(87) PCT Pub. No.: WO2020/115155

PCT Pub. Date: Jun. 11, 2020

(65) Prior Publication Data

US 2022/0117309 A1 Apr. 21, 2022

(30) Foreign Application Priority Data

Dec. 6, 2018 (EP) .................................... 18210863
May 2, 2019 (EP) .................................... 19172325

(51) Int. Cl.
*A24F 40/485* (2020.01)
*A24D 1/20* (2020.01)
(Continued)

(52) U.S. Cl.
CPC .............. *A24F 40/485* (2020.01); *A24D 1/20* (2020.01); *A24F 7/00* (2013.01); *A24F 40/10* (2020.01);
(Continued)

(58) Field of Classification Search
CPC ........ A24F 40/485; A24F 40/10; A24F 40/46; A24F 40/20; A24F 7/00; A24D 1/20;
(Continued)

(56) References Cited

U.S. PATENT DOCUMENTS

| | | | |
|---|---|---|---|
| 3,099,594 | A | 7/1963 | Caines et al. |
| 4,284,089 | A | 8/1981 | Ray |

(Continued)

FOREIGN PATENT DOCUMENTS

| | | | |
|---|---|---|---|
| BE | 347 873 | A | 1/1928 |
| CN | 1568843 | A | 1/2005 |

(Continued)

OTHER PUBLICATIONS

International Search Report and Written Opinion issued on Feb. 28, 2020 in PCT/EP2019/083715 filed on Dec. 4, 2019.

(Continued)

*Primary Examiner* — Abdullah A Riyami
*Assistant Examiner* — Vladimir Imas
(74) *Attorney, Agent, or Firm* — Oblon, McClelland, Maier & Neustadt, L.L.P.

(57) ABSTRACT

An aerosol-generating system is provided, including: an aerosol-forming substrate; and a venturi element including an airflow channel, the airflow channel including an inlet portion, a central portion, and an outlet portion, and the inlet portion is configured to converge towards the central portion with an inlet angle of between 1° and 19°, and the outlet portion is configured to diverge from the central portion.

26 Claims, 12 Drawing Sheets

(51) Int. Cl.

| | |
|---|---|
| ***A24F 7/00*** | (2006.01) |
| ***A24F 40/10*** | (2020.01) |
| ***A24F 40/20*** | (2020.01) |
| ***A24F 40/46*** | (2020.01) |
| ***B01F 23/213*** | (2022.01) |
| ***B01F 25/312*** | (2022.01) |
| ***B01F 35/92*** | (2022.01) |
| *B01F 35/90* | (2022.01) |

(52) U.S. Cl.
CPC .............. *A24F 40/20* (2020.01); *A24F 40/46* (2020.01); *B01F 23/2132* (2022.01); *B01F 25/31241* (2022.01); *B01F 25/31252* (2022.01); *B01F 25/312532* (2022.01); *B01F 35/92* (2022.01); *B01F 2035/99* (2022.01); *B01F 2215/0427* (2013.01)

(58) Field of Classification Search
CPC .......... B01F 25/31252; B01F 25/31241; B01F 25/312532; B01F 35/92; B01F 23/2132; B01F 2035/99; B01F 2215/0427
USPC .......................................................... 131/329
See application file for complete search history.

(56) References Cited

U.S. PATENT DOCUMENTS

| | | | | |
|---|---|---|---|---|
| 4,413,641 | A | 11/1983 | Dwyer, Jr. et al. | |
| 4,517,996 | A * | 5/1985 | Vester | A24D 3/043 131/344 |
| 4,774,971 | A * | 10/1988 | Vieten | A24F 42/20 131/362 |
| 4,848,374 | A * | 7/1989 | Chard | A24F 42/10 131/194 |
| 4,949,736 | A * | 8/1990 | Roberts | A24D 3/041 131/198.1 |
| 8,869,792 | B1 | 10/2014 | Lee | |
| 10,334,884 | B2 * | 7/2019 | Rogan | H05B 6/108 |
| 11,478,807 | B2 * | 10/2022 | Fernando | A24F 40/485 |
| 2003/0154897 | A1 * | 8/2003 | Burg | B63B 1/38 114/67 A |
| 2007/0107410 | A1 * | 5/2007 | Bertsch | D02J 1/08 57/350 |
| 2007/0152355 | A1 * | 7/2007 | Hartley | B01F 25/312 261/DIG. 12 |
| 2010/0236546 | A1 * | 9/2010 | Yamada | A61M 11/042 128/200.21 |
| 2011/0315152 | A1 * | 12/2011 | Hearn | A61M 15/0093 131/273 |
| 2013/0192615 | A1 | 8/2013 | Tucker et al. | |
| 2013/0192616 | A1 | 8/2013 | Tucker et al. | |
| 2013/0192619 | A1 | 8/2013 | Tucker et al. | |
| 2013/0192620 | A1 | 8/2013 | Tucker et al. | |
| 2013/0192621 | A1 | 8/2013 | Li et al. | |
| 2013/0192622 | A1 | 8/2013 | Tucker et al. | |
| 2013/0192623 | A1 | 8/2013 | Tucker et al. | |
| 2013/0213419 | A1 * | 8/2013 | Tucker | A24F 40/46 131/328 |
| 2014/0238423 | A1 * | 8/2014 | Tucker | A24F 40/44 131/328 |
| 2014/0261492 | A1 * | 9/2014 | Kane | A24F 40/485 131/328 |
| 2015/0122276 | A1 | 5/2015 | Johnson et al. | |
| 2015/0122277 | A1 * | 5/2015 | Frobisher | A24D 1/00 131/338 |
| 2016/0081394 | A1 | 3/2016 | Alarcon et al. | |
| 2016/0120229 | A1 | 5/2016 | Tucker et al. | |
| 2016/0165956 | A1 | 6/2016 | Tucker et al. | |
| 2016/0165957 | A1 | 6/2016 | Tucker et al. | |
| 2016/0183598 | A1 | 6/2016 | Tucker et al. | |
| 2016/0183599 | A1 | 6/2016 | Tucker et al. | |
| 2016/0346758 | A1 | 12/2016 | Kress et al. | |
| 2016/0360795 | A1 | 12/2016 | Tucker et al. | |
| 2017/0020199 | A1 | 1/2017 | Tucker et al. | |
| 2017/0042249 | A1 | 2/2017 | Tucker et al. | |
| 2017/0238615 | A1 | 8/2017 | Tucker et al. | |
| 2017/0238616 | A1 | 8/2017 | Tucker et al. | |
| 2017/0303590 | A1 * | 10/2017 | Cameron | A24F 40/00 |
| 2017/0347716 | A1 | 12/2017 | Tucker et al. | |
| 2017/0360093 | A1 * | 12/2017 | Fernando | A24F 40/485 |
| 2018/0000159 | A1 * | 1/2018 | Rogan | A61M 11/06 |
| 2018/0007972 | A1 | 1/2018 | Thorens | |
| 2018/0007973 | A1 | 1/2018 | Thorens | |
| 2018/0007974 | A1 | 1/2018 | Thorens | |
| 2018/0015237 | A1 | 1/2018 | Thorens | |
| 2018/0103687 | A1 | 4/2018 | Tucker et al. | |
| 2018/0116296 | A1 | 5/2018 | Tucker et al. | |
| 2018/0192703 | A1 | 7/2018 | Tucker et al. | |
| 2018/0235280 | A1 | 8/2018 | Biel et al. | |
| 2018/0352866 | A1 | 12/2018 | Tucker et al. | |
| 2019/0313699 | A1 * | 10/2019 | Rogan | H05B 6/108 |
| 2022/0030951 | A1 * | 2/2022 | Lavanchy | A24F 40/485 |
| 2022/0117309 | A1 * | 4/2022 | Emmett | A24F 40/485 |
| 2022/0295898 | A1 * | 9/2022 | Batista | A61M 15/0021 |
| 2022/0312851 | A1 * | 10/2022 | Batista | H05B 6/108 |

FOREIGN PATENT DOCUMENTS

| | | | |
|---|---|---|---|
| CN | 104939314 | A | 9/2015 |
| CN | 204635083 | U | 9/2015 |
| CN | 105982363 | A | 10/2016 |
| CN | 106998819 | A | 8/2017 |
| CN | 107205495 | A | 9/2017 |
| CN | 108185517 | A | 6/2018 |
| DE | 20 2015 105 037 | U1 | 12/2015 |
| FR | 839 794 | A | 4/1939 |
| GB | 10910 | A | 4/1912 |
| GB | 986391 | | 3/1965 |
| GB | 1 227 333 | | 4/1971 |
| GB | 1 324 719 | A | 7/1973 |
| GB | 2 137 067 | A | 10/1984 |
| JP | 2015-502172 | A | 1/2015 |
| JP | 2017-504361 | A | 2/2017 |
| KR | 20-0404745 | Y1 | 12/2005 |
| KR | 10-2014-0107553 | A | 9/2014 |
| KR | 10-2016-0040442 | A | 4/2016 |
| RU | 2 616 556 | C2 | 4/2017 |
| WO | WO 2014/183073 | A1 | 11/2014 |
| WO | WO 2016/124740 | A1 | 8/2016 |
| WO | WO 2016/195116 | A2 | 12/2016 |
| WO | WO 2017/207586 | A1 | 12/2017 |

OTHER PUBLICATIONS

Korean Office Action issued May 12, 2023 in Korean Patent Application No. 10-2021-7010407 (with English Translation), 18 pages.
Japanese Office Action issued Jul. 21, 2022 in Japanese Patent Application No. 2021-532048 (with English translation), 33 pages.
Extended European Search Report issued Jun. 28, 2019 in European Patent Application No. 18210863.9, 7 pages.
Extended European Search Report issued Nov. 5, 2019 in European Patent Application No. 19172325.3, (with PCT-Direct Letter of 43480-PCT dated Dec. 4, 2019), 23 pages.
Combined Chinse Office Action and Search Report issued Sep. 19, 2022 in Chinese Patent Application No. 201980071021.3 (with English translation), 20 pages.
Russian Search Report issued Nov. 22, 2021 in Russian Patent Application No. 2021111749 (submitting English translation only), 2 pages.
Combined Chinese Office Action and Search Report issued Sep. 27, 2023 in Chinese Patent Application No. 201980071021.3 (with English Translation of Office Action only), 19 pages.

* cited by examiner 26
28
30
24
32
α
θ
L_central
L_inlet
L_outlet

AEROSOL-GENERATING SYSTEM COMPRISING VENTURI ELEMENT

CROSS-REFERENCE TO RELATED APPLICATIONS

This application is a U.S. national stage application of PCT/EP2019/083715, filed on Dec. 4, 2019, which is based upon and claims the benefit of priority under 35 U.S.C. § 119 from European patent application no. 19172325.3, filed May 2, 2019, and from European patent application no. 18210863.9, filed Dec. 6, 2018, the entire contents of each of which are incorporated herein by reference.

TECHNICAL FIELD

The present invention relates to an aerosol-generating system and to a kit of venturi elements.

DESCRIPTION OF THE RELATED ART

It is known to provide an aerosol-generating device for generating an inhalable vapor. Such devices may heat aerosol-forming substrate to a temperature at which one or more components of the aerosol-forming substrate is volatilised, without burning the aerosol-forming substrate. Such aerosol-forming substrates may be provided as part of an aerosol-generating article.

Such aerosol-generating articles may comprise numerous components. For example, it is known to provide an aerosol-generating article comprising a substrate portion, a filter portion, a cooling portion and a spacer portion. The cooling portion may comprise a crimped sheet of material, such as polylactic acid (PLA). The spacer portion may comprise a hollow tube, such as a hollow acetate tube. The spacer portion may provide the aerosol-generating article with improved structural stability and might contributing to improved aerosol-generation. The cooling portion may contribute to improved aerosol-generation.

Such aerosol-generating devices may be arranged to receive an aerosol-generating article comprising an aerosol-forming substrate. The aerosol-generating article may have a rod shape for insertion of the aerosol-generating article into a cavity, such as a heating chamber, of the aerosol-generating device. A heating element may be arranged in or around the heating chamber for heating the aerosol-forming substrate when the aerosol-generating article is inserted into the heating chamber of the aerosol-generating device. Typically, one or more components of the aerosol-forming substrate is vaporized by the heating element, becomes entrained in air, forming an aerosol. Aerosol formation, in particular droplet size, depends upon multiple factors such as temperature, air pressure.

It would be desirable to provide an aerosol-generating system with improved aerosol generation. It would be desirable to provide an aerosol-generating system which facilitates customization of the generatable aerosol. It would be desirable to provide an aerosol-generating system with improved aerosol generation for different aerosol-forming substrates. It would be desirable to provide an aerosol-generating system with improved RTD. It would be desirable to provide an aerosol-generating system with improved mouthfeel. It would be desirable to provide an aerosol-generating system with improved flavour delivery. It would be desirable to provide an aerosol-generating article comprising fewer components.

BRIEF DESCRIPTION OF THE DRAWINGS

Features described in relation to one aspect may equally be applied to other aspects of the invention.

The invention will be further described, by way of example only, with reference to the accompanying drawings in which.

DETAILED DESCRIPTION

Figure 1:
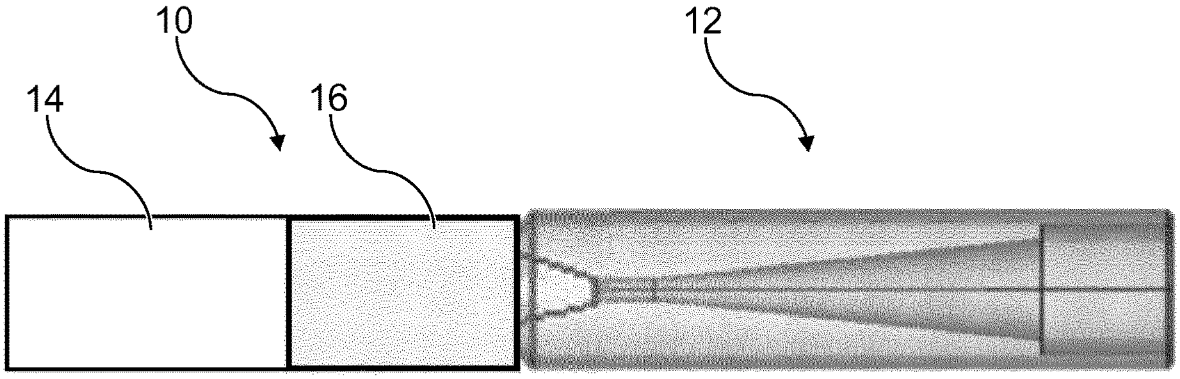
FIG. 1 shows a system comprising an aerosol-generating article and a venturi element, in which the aerosol-generating article and the venturi element are permanently fixed to each other.

According to an aspect of the invention there is provided an aerosol-generating system comprising an aerosol-forming substrate and a venturi element.

Cost-efficient manufacturing is an advantage of providing a venturi element in the aerosol-generating system. By provided the venturi element in the aerosol-generating system, a separate cooling portion such as a crimped PLA or a hollow acetate tube (HAT) may no longer be necessary for aerosol generation.

SUMMARY

The aerosol-generating system may comprise an aerosol-generating article. The aerosol-generating article may comprise the aerosol-forming substrate. The aerosol-generating article may comprise the venturi element. The venturi element may be part of the aerosol-generating article, preferably integral part of the aersosol-generating article, more preferably integrally formed with the aerosol-generating article. The venturi element may be non-removably attachable to the aerosol-generating article.

It may not be necessary for a user to assemble the system, particularly to attach the venturi element to the aerosol-generating article. Simplification or ease-of-use may be an advantage of the aerosol-generating article comprising the venturi element. Simplification of production of the venturi element being integrally part of the aerosol-generating article may be another advantage due to the fact that the venturi element may be formed together with aerosol-forming substrate during the manufacturing of the aerosol-generating article. A consistent smoking experience may be a further advantage of this aspect, since the correct alignment of the venturi element with the aerosol-forming substrate comprised in the aerosol-generating article may be guaranteed during production.

The term "part of", preferably "integral part of", more preferably "integrally formed" may denote a configuration, in which the aerosol-generating article and the venturi element are configured as a single piece. In other words, the venturi element and the aerosol-generating article cannot be separated.

In some embodiments, the venturi element may be configured attachable to the aerosol-generating article. Preferably, the venturi element may be configured removably attachable to the aerosol-generating article.

Interchangeability is an advantage of the removably attachable configuration of the venturi element. The venturi element may be interchangeable for different delivery profiles, different smoking experiences and different aerosol vaporizations. Different delivery profiles, different smoking experiences and different aerosol vaporization's may be referred to in the following as usage experience. Customization may be pleasant for the user, since a user may be able to adapt the usage experience to his/her personal preferences. A user may change the attached venturi element according to a desired usage experience. According to this aspect, the venturi element may be re-usable, which may reduce waste.

In the following, the attachment between the venturi element and the aerosol-generating article is described in more detail. Preferably, the attachment as described below is facilitated in the aspect, in which the venturi element is removably attachable to the aerosol-generating article. However, the attachment as described below may also be utilized in the aspect, in which the attachment will be permanent so that the venturi element is an integral part of the aerosol-generating article.

The aerosol-generating article may comprise a connection portion. The venturi element may comprise an airflow channel comprising an inlet portion. The venturi element may comprise a connection element. The inlet portion may comprise the connection element. The connection element may alternatively be arranged adjacent the inlet portion. The connection portion of the aerosol-generating article may be configured for removably receiving the connection element of the venturi element.

In some embodiments, the connection portion of the aerosol-generating article may be configured as a filter portion, particularly as a hollow acetate tube.

The connection portion may alternatively be made from any desirable material which enables removably receiving the connection element of the venturi element into the connection portion. The connection element of the venturi element may be an integral part of the venturi element. The connection element is preferably arranged at the upstream end of the venturi element. The connection element may be an integral part of the inlet portion or arranged directly next to the inlet portion. The connection element may be made from a solid material which enables piercing of the connection portion of the aerosol-generating article. The connection element may be configured to penetrate into the connection portion of the aerosol-generating article. The connection element of the venturi element may comprise an airflow channel, preferably a hollow central airflow channel. The connection element of the venturi element may have a tapered configuration towards the upstream end of the connection element to simplify insertion of the connection element into the connection portion of an aerosol-generating article. The venturi element may then be arranged in direct abutment to the aerosol-generating article, more particularly to the connection portion of the aerosol-generating article. The connection portion of the aerosol-generating article may have a substantially tubular shape. The connection portion of the aerosol-generating article may have a hollow tubular shape so that the connection element of the venturi element may be inserted into the hollow tubular connection portion. The inner wall of the hollow tubular connection portion of the aerosol-generating article may comprise mechanical retaining means configured for retaining the connection element of the venturi element inside of the connection portion of the aerosol-generating article. The venturi element may be provided as a reusable element to be used with multiple aerosol-generating articles. After an aerosol-generating article is spent, the venturi element may be removed from the article and connected with a fresh article. For example, a venturi element may be provided with a pack of the aerosol-generating articles so that the venturi element may be used for all of the aerosol-generating articles contained in the pack. Costs may thus be saved by providing a single venturi element for multiple aerosol-generating articles.

The connection element of the venturi element may comprise mechanical retaining means configured for retaining the connection element of the venturi element within the connection portion of the aerosol-generating article. Mechanical retaining means may be configured to permanently attach the venturi element with the aerosol-generating article. The mechanical retaining means may also be configured to enable separation of the venturi element from the aerosol-generating article.

The connection element of the venturi element may comprise mechanical retaining means in the form of a step arranged on the outer perimeter of the connection element. Advantageously, this helps to securely hold the connection element inside of the connection portion of the aerosol-generating article after insertion of the connection element into the connection portion. The mechanical retaining means may alternatively or additionally be configured as a rib, protrusion, hook or similar element. Advantageously, this helps to securely hold the connection element of the venturi element inside the connection portion of the aerosol-generating article. The connection element of the venturi element may have a circular cross-section. Alternatively, the connection element of the venturi element may have an oval, rectangular or differently shaped cross-section. Advantageously, this enables a keyed configuration. A keyed configuration may mean that the connection element of the venturi element may only be inserted into the connection portion of the aerosol-generating article in a specific orientation. If the connection portion of the aerosol-generating article comprises mechanical retaining means, these mechanical retaining means may be configured to engage or interlock with the mechanical retaining means of the connection element of the venturi element.

The aerosol-generating article may be configured rod shaped. The aerosol-generating article may be configured as a rod. The aerosol-generating article and the venturi element may be configured rod shaped. The aerosol-generating article and the venturi element may be configured as a rod. A wrapping material, preferably a wrapping paper, may be arranged wrapping the aerosol-generating article. The wrapping material may be arranged wrapping the aerosol-generating article and the venturi element. Also, the individual components may be concealed by the wrapping paper. Advantageously, this means that a uniform outer appearance may be achieved.

As used herein, the term 'rod' may be used to denote a generally cylindrical element of substantially circular, oval or elliptical cross-section.

The removably attachable venturi element may be provided with a marker arranged on the outside of the venturi element. The marker may be an optical marker or a haptic marker. Preferably, the marker comprises a color. Alternatively or additionally, the marker may comprise a surface structure to identify the marker. The marker may assist the user to attach the venturi element with the aerosol-generating article in the right direction. The marker may specify the correct attachment of the venturi element with the aerosol-generating article. For example, the removably attachable venturi element may be provided with a marker, preferably arranged on the outside of the venturi element, more preferably on the outside of the connection portion of the venturi element, most preferably on the wrapping material of the venturi element.

The venturi element may be configured with two connection portions at opposite ends. The venturi element may be attachable with the aerosol-generating article in one or more different orientations, preferably in reverse orientations. The different connection portions may enable different aerosol generation experiences for user. The first connection portion may correspond to a first attachment orientation of the venturi element with the aerosol-generating article. The first attachment orientation may correspond to a first usage experience. The second connection portion may correspond to a second attachment orientation of the venturi element with the aerosol-generating article. The second attachment orientation may correspond to a second usage experience.

The venturi element may be provided with two or more markers, preferably arranged on the outside of the venturi element, more preferably arranged on the outside of each connection portion of the venturi element, most preferably arranged on the wrapping material of the venturi element. For example, the venturi element provided with two connection portions may be configured with one marker arranged on the outside of one first connection portion of the venturi element and with a different marker on the outside of the second connection portion of the venturi element. The markers may comprise information for the user. For example, the markers may indicate different usage experiences. The different directions of attaching the venturi element to the aerosol-generating article may be indicated by the different markers. For example, the markers may be colored markers. A first attachment direction of the venturi element may correspond to a smooth usage experience. The venturi element may be configured to create a smooth usage experience, if attached to the aerosol-generating article in the first direction. A second attachment direction of the venturi element may correspond to a strong usage experience. The venturi element may be configured to create a strong usage experience, if attached to the aerosol-generating article in the second direction.

Providing a venturi element may enhance aerosol generation. Optimized droplets of the aerosol may be generated within the venturi element. Conventionally, an aerosol-generating article may have been provided containing elements such as a cooling section for cooling an air stream through the article and for generating an inhalable aerosol within the article itself. By providing a venturi element, as in the present invention, the aerosol-generating article may be constructed in a simpler way. For example, a cooling section could potentially be omitted. The venturi element may be configured for reducing the temperature of the air containing vaporized aerosol-forming substrate flowing through the venturi element. The venturi element, particularly the dimensions of the venturi element, is/are configured to generate an aerosol having an advantageous droplet size or advantageous ranges of preferred droplet sizes or an advantageous droplet size distribution.

The venturi element is configured to utilize the venturi effect. In other words, the venturi element has a shape such that the venturi effect occurs, when fluid flows through the venturi element. The venturi element may be configured to utilize or provide the venturi effect as described below. The venturi element may comprise the airflow channel arranged along the longitudinal axis of the venturi element. The airflow channel may be a central airflow channel.

The airflow channel may be arranged along the longitudinal axis of the venturi element so that the longitudinal axis of the aerosol-generating article may align with the longitudinal axis of the venturi element. In other words, the airflow channel of the venturi element may be aligned with the aerosol-generating article such that air may be drawn through the aerosol-generating article and into the central channel of the venturi element for subsequent inhalation by a user.

The venturi effect is the reduction of the pressure of a fluid during flow of the fluid through a constricted airflow passage. The structural elements of the venturi element of the present invention will be described in more detail below. The venturi element comprises a constricted airflow passage, also referred to as central portion. The fluid flowing through the venturi element may be one or more of air, air comprising or entrained with vaporized aerosol-forming substrate and aerosol. In the following, for simplicity if the term 'air' will be used, this term may encompass air, air comprising or entrained with vaporized aerosol-forming substrate, aerosol, or any mixture thereof. Preferably, air comprising vaporized aerosol-forming substrate flows through the central portion of the venturi element. After exiting the central portion of the venturi element, the air may expand and accelerate, consequently cool down. The cooling of the air may lead to droplet formation and therefore aerosol generation.

The venturi element may be located immediately downstream of the aerosol-generating article and may abut the aerosol-generating article.

As used herein, the terms 'upstream' and 'downstream' are used to describe the relative positions of components, or portions of components, of the venturi element and the aerosol-generating article according to the invention in relation to the direction of air drawn through the venturi element and the aerosol-generating article during use thereof. The term 'downstream' may be understood as being closer to a mouth end than a distal end and. The term 'upstream' may be understood as being closer to a distal end than to a mouth end.

As used herein, the term 'aerosol-generating article' refers to an article comprising an aerosol-forming substrate. As used herein, the term 'aerosol-generating substrate' refers to a material that is capable of releasing volatile compounds that can form an aerosol. For example, an aerosol-forming substrate may be arranged to generate an aerosol that is directly inhalable into a user's lungs through the user's mouth. An aerosol-generating article may be disposable.

The aerosol-generating article may comprise a substrate portion comprising the aerosol-forming substrate and a filter portion. The filter portion preferably is arranged downstream of the substrate portion. Preferably, the venturi element is arranged downstream of the filter portion. The substrate portion may be arranged in direct abutment to the filter portion. The filter portion may be arranged in direct abutment with the venturi element.

The filter portion may comprise for example a hollow tubular filter portion, preferably a hollow acetate tube (HAT), a fine hollow acetate tube (FHAT) or a plug of tow wrapped around a central cardboard tube, all of which structures being known from manufacture of filter elements used in aerosol-generating articles. The filter portion preferably comprises a hollow central bore.

The filter portion may be formed from any suitable material or combination of materials. For example, the filter portion may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the filter portion is formed from cellulose acetate.

The filter portion may comprise a hollow tubular element. In a preferred embodiment, the filter portion comprises a hollow cellulose acetate tube.

The filter portion preferably has an external diameter that is approximately equal to the external diameter of the aerosol-generating article.

The filter portion may have an external diameter of between approximately 4 mm and approximately 8 mm. For example, the filter portion may have an external diameter of between approximately 5 mm and approximately 6 mm. In some embodiments, the filter portion may have an external diameter of around 5.3 mm. The filter portion may have a length of between approximately 10 mm and approximately 25 mm. In some embodiments, the filter portion may have a length of approximately 13 mm.

The aerosol-generating article may be substantially cylindrical in shape. However, alternatively other cross sections may be used. Indeed, the cross section of the aerosol-generating article may vary along its length, for example by varying the shape of the cross section or the cross sectional dimensions. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between 30 mm and 60 mm, preferably between 40 mm and 50 mm, more preferably 45 mm. The aerosol-generating article may have an external diameter between approximately 4 mm and 8 mm, preferably between 5 mm and 6 mm, more preferably around 5.3 mm. In one embodiment, the aerosol-generating article has a total length of approximately 45 mm. Further, the aerosol-forming substrate may have a length of between 10 mm to 55 mm, preferably between 20 mm and 55 mm. The aerosol-generating article may comprise an outer paper wrapper.

As used herein, an 'aerosol-generating device' relates to a device that interacts with an aerosol-forming substrate to generate an aerosol. The aerosol-forming substrate may be part of an aerosol-generating article. An aerosol-generating device may be a device that interacts with an aerosol-forming substrate of an aerosol-generating article to generate an aerosol. The aerosol-generating device may comprise a housing, electric circuitry, a power supply, a cavity, preferably configured as a heating chamber, and a heating element.

The electric circuitry may comprise a microprocessor, which may be a programmable microprocessor. The microprocessor may be part of a controller. The electric circuitry may comprise further electronic components. The electric circuitry may be configured to regulate a supply of power to the heating element. Power may be supplied to the heating element continuously following activation of the system or may be supplied intermittently, such as on a puff-by-puff basis. The power may be supplied to the heating element in the form of pulses of electrical current. The electric circuitry may be configured to monitor the electrical resistance of the heating element, and preferably to control the supply of power to the heating element dependent on the electrical resistance of the heating element.

The device may comprise a power supply, typically a battery, within the main body. As an alternative, the power supply may be another form of charge storage device such as a capacitor. The power supply may require recharging and may have a capacity that enables to store enough energy for one or more usage experiences; for example, the power supply may have sufficient capacity to continuously generate aerosol for a period of around six minutes or for a period of a multiple of six minutes. In another example, the power supply may have sufficient capacity to create an aerosol for multiple puffs.

The power supply may be any suitable power supply, for example a DC voltage source such as a battery. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

The cavity may be configured to receive one or more aerosol-generating articles. The cavity may receive the aerosol-forming substrate. The cavity may surround the heating element. The cavity may be the heating chamber. The received aerosol-forming substrate may be heated. The received aerosol-forming substrate may be heated to a temperature higher than the ambient temperature. The temperature may be the temperature at which one or more volatile compounds are released from the aerosol-forming substrate and at which the aerosol-forming substrate does not combust.

The heating element may be an internal heating element, where "internal" refer to the aerosol-forming substrate. The internal heating element may take any suitable form.

The internal heating element may be one or more heating needles or rods that run through the center of the aerosol-forming substrate, preferably arranged to at least partially penetrate an internal portion of the aerosol-forming substrate.

Alternatively, the internal heating element may take the form of a heating blade. Alternatively, the internal heater may take the form of a casing or substrate having different electro-conductive portions, or an electrically resistive metallic tube. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

The heating element may be an external heating element, where "external" refer to the aerosol-forming substrate. The external heating element may take any suitable form. The heating element may take the form, preferably be arranged, to heat at least an external surface of the aerosol-forming substrate or of the aerosol-generating article comprising aerosol-forming substrate.

Alternatively, the external heating element may take the form of one or more flexible heating foils on a dielectric substrate, such as polyimide. The flexible heating foils can be shaped to conform to the perimeter of the cavity. Alternatively, the external heating element may take the form of a metallic grid or grids, a flexible printed circuit board, a molded interconnect device (MID), ceramic heater, flexible carbon fibre heater or may be formed using a coating technique, such as plasma vapour deposition, on a suitable shaped substrate. The external heating element may also be formed using a metal having a defined relationship between temperature and resistivity. In such an exemplary device, the metal may be formed as a track between two layers of suitable insulating materials. The external heating element formed in this manner may be used to both heat and monitor the temperature of the external heating element during operation. The external heating element may be arranged around a perimeter of the cavity.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element may heat the aerosol-forming substrate by means of conduction. The heating element may be at least partially in contact with the substrate, or the carrier on which the substrate is deposited. Alternatively, the heat from either an external or internal heating element may be conducted to the substrate by means of a heat conductive element.

The aerosol-generating device may comprise an external heating element or an internal heating element, or both external and internal heating elements.

The venturi element may be arranged connectable downstream to the heating chamber of the aerosol-generating device. The heating chamber may be configured for insertion of an aerosol-generating article into the heating chamber. Once inserted into the heating chamber, an aerosol-generating article may be arranged upstream of the venturi element.

The present invention may also relate to a system comprising an aerosol-generating article as described herein and a venturi element as described herein separate or as part of an aerosol-generating device as described herein. In some embodiments, the aerosol-generating article is separate from the venturi element. In some embodiments the aerosol-generating article is separate from the aerosol-generating device. In some embodiments the venturi element is separate from the aerosol-generating device. In some embodiments both the aerosol-generating article and the venturi element are separate from the aerosol-generating device, but not from each other. In some embodiments, both the aerosol-generating article and the venturi element are separate from the device and with each other. In some embodiments, the aerosol-generating article is engageable with the venturi element. In some embodiments the aerosol-generating article is engageable with the aerosol-generating device. In some embodiments the venturi element is engageable with the aerosol-generating device. In some embodiments, the aerosol-generating article is engageable with the venturi element in a reversible manner. In some embodiments the aerosol-generating article is engageable with the aerosol-generating device in a reversible manner. In some embodiments the venturi element is engageable with the aerosol-generating device in a reversible manner.

The venturi element may comprise the airflow channel, wherein the airflow channel may comprise the inlet portion, a central portion and an outlet portion, wherein the inlet portion may be configured converging towards the central portion and the outlet portion may be configured diverging from the central portion.

The inlet portion may be arranged adjacent to an upstream end of the venturi element. The outlet portion may be arranged adjacent to a downstream end of the venturi element. The inlet portion may be arranged opposite the outlet portion. The central portion may be arranged between the inlet portion and the outlet portion. The inlet portion may be arranged in direct abutment with the central portion. The central portion may be arranged in direct abutment with the outlet portion. The inlet portion may be configured for entry of air into the venturi element. The outlet portion may be configured to allow air being drawn out of the venturi element. The inlet portion, the central portion and the outlet portion may be fluidly connected with each other. The inlet portion, the central portion and the outlet portion together may form the airflow channel of the venturi element. The inlet portion, the central portion and the outlet portion may together enable airflow through the venturi element.

The term 'converging' may denote that the inner diameter of the inlet portion may decrease towards the central portion. In other words, the inner diameter of the inlet portion may decrease from the upstream direction towards the downstream direction. The inlet portion may have a hollow conical shape. The inlet portion may be tapered towards the central portion.

The term 'diverging' may denote that the inner diameter of the outlet portion may increase towards the downstream end of the venturi element. In other words, the inner diameter of the outlet portion may increase from the upstream direction towards the downstream direction. The outlet portion may have a hollow conical shape. The outlet portion may be tapered towards the central portion. The central portion may have a constant diameter.

The inner portion, the central portion and the outlet portion may have a circular cross-section. The inner portion, the central portion and the outlet portion may have differing cross-sections. One or more of the inner portion, the central portion and the outlet portion may have a circular, oval, rectangular or differently shaped cross-section. The only requirement of the venturi element is that the cross-sectional area of the central portion is smaller than the cross-sectional area of the outlet portion so that the central portion constitutes a constricted airflow passage. The central portion is optional. The central portion is the portion with the smallest diameter between the inlet portion and the outlet portion. The central portion may have any suitable length, preferably, the central portion has a length of below 4 mm, more preferably below 2 mm, most preferably below 1 mm. In a particularly preferred embodiment, there is no central portion where the inlet portion and the outlet portion abut with each other directly. In this case, the term "central portion" may be used to refer to that cross section of the venturi portion where the constriction is the smallest, even if physically the inlet portion and the outlet portion touch in that cross section. In this embodiment the length of the central cross section may be in principle zero.

The venturi element may be configured as a mouthpiece of the aerosol-generating device. The venturi element may be configured as a mouthpiece, or as part of a mouthpiece. The mouthpiece preferably is configured as reusable mouthpiece to be used with multiple aerosol-generating articles. Conventionally, a cooling section may have been provided in aerosol-generating articles for the purpose of cooling the air stream and to enable aerosol generation. Such a cooling section may be omitted by using a venturi element configured as a mouthpiece according to the present invention.

The venturi element may be part of the aerosol-generating device. The venturi element may be provided separate from the aerosol-generating device, but connectable with the aerosol-generating device, such as by a hinge. The venturi element may be an integral part of the aerosol-generating device. The venturi element may be configured as a mouthpiece of the aerosol-generating device. The venturi element may be configured as a separate mouthpiece connectable with the aerosol-generating device.

The aerosol-generating article may comprise a portion of aerosol-forming substrate. The aerosol-forming substrate is a substrate capable of releasing volatile compounds that can form an aerosol. An aerosol-forming substrate may conveniently be part of an aerosol-generating article or the aerosol-generating article. The volatile compounds may be released by heating the aerosol-forming substrate. The aerosol-forming substrate may comprise nicotine. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may be a non-liquid aerosol-forming substrate. Alternatively, the aerosol-forming substrate may comprise both non-liquid and liquid components. As a further alternative, the aerosol-forming substrate may be provided in a liquid form.

In some embodiments of the present invention, an aerosol-generating system may comprise: an aerosol-generating article containing non-liquid aerosol-forming substrate, and a venturi element. The venturi element may be configured attachable to the aerosol-generating article.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are for example: polyhydric alcohols, such as triethylene glycol, 1,3-butanediol and glycerine; esters of polyhydric alcohols, such as glycerol mono-, di- or triacetate; and aliphatic esters of mono, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The aerosol-former may be propylene glycol. The aerosol former may comprise both glycerine and propylene glycol.

Preferably, the amount of aerosol former is between 6 percent and 20 percent by weight on a dry weight basis of the aerosol-forming substrate, more preferably, the amount of aerosol former is between 8 percent and 18 percent by weight on a dry weight basis of the aerosol-forming substrate, most preferably the amount of aerosol former is between 10 percent and 15 percent by weight on a dry weight basis of the aerosol-forming substrate. For some embodiments the amount of aerosol former has a target value of about 13 percent by weight on a dry weight basis of the aerosol-forming substrate. The most efficient amount of aerosol former will depend also on the aerosol-forming substrate, whether the aerosol-forming substrate comprises plant lamina or homogenized plant material. For example, among other factors, the type of substrate will determine to which extent the aerosol-former can facilitate the release of substances from the aerosol-forming substrate.

The aerosol-forming substrate may comprise a non-liquid aerosol-forming substrate. The aerosol-forming substrate may be a non-liquid aerosol-forming substrate. The aerosol-forming substrate may comprise a non-liquid aerosol-forming substrate The non-liquid aerosol-forming substrate may comprise plant-based material. The non-liquid aerosol-forming substrate may comprise tobacco. The non-liquid aerosol-forming substrate may comprise homogenised plant-based material, including homogenized tobacco, for example made by, for example, a paper making process or a casting process. An aerosol-generating article comprising non-liquid aerosol-forming substrate comprising tobacco may be referred to as a tobacco stick. Preferably, the aerosol-forming substrate is a non-liquid. Preferably, the aerosol-forming substrate comprises a non-liquid. The non-liquid aerosol-forming substrate may comprise at least one aerosol-former. In some embodiments, the at least one aerosol-former may be at least one of the compounds described above. For example, the aerosol-forming substrate may comprise aerosol-formers such as polyhydric alcohols. During, for example, manufacture of the aerosol-generating article, at least one aerosol-former may be absorbed by the non-liquid aerosol-forming substrate. For example, during manufacturing of the aerosol-generating article, at least one aerosol-former may be absorbed by, for example, plant-based material, such as homogenized tobacco. Upon heating of the non-liquid aerosol-forming substrate the aerosol-former may evaporate. The aerosol-former may form an aerosol together with volatile compounds from the non-liquid aerosol-forming substrate, for example nicotine, or nicotine salts.

Advantageously, a more natural taste and appearance of the aerosol-generating article can be achieved by using natural plant material lamina. The term "lamina" refers to the part of a plant leaf blade without the stem.

If the aerosol-forming substrate comprises non-liquid aerosol-forming substrate, preferably a solid aerosol-forming substrate. The solid aerosol-forming substrate may comprise, for example, one or more of: powder, granules, pellets, shreds, spaghettis, strips or sheets containing one or more of: herb leaf, tobacco leaf, fragments of tobacco ribs, homogenised sheet tobacco, preferably reconstituted tobacco, more preferably cast leaf tobacco, extruded tobacco, and expanded tobacco.

The non-liquid aerosol-forming substrate may be an Electrically Heated Tobacco Product (EHTP). In some embodiments, all of the tobacco in the EHTP may be homogenised sheet tobacco, preferably reconstituted tobacco, preferably cast leaf tobacco, made from tobacco powder, water, glycerin, guar gum and cellulose fibers. The non-liquid aerosol-forming substrate may be made of cast leaf tobacco. The cast leaf tobacco may be gathered and crimped. The cast leaf tobacco may be produced of sheets of homogenised tobacco materials by a reconstitution process. The reconstitution process may be a 'cast leaf' process or casting. The sheets of homogenised tobacco material may be gathered. The sheets of homogenised tobacco material may be formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface. For example, in certain embodiments sheets of homogenised tobacco material for use in the invention may be formed from a slurry comprising particulate tobacco, guar gum, cellulose fibres and glycerine by a casting process.

As used herein, the term 'gathered' may denote that the sheet of homogenised tobacco material is convoluted, folded, or otherwise compressed or constricted substantially transversely to the cylindrical axis of the rod.

The term 'sheet' may denote a laminar element having a width and length substantially greater than the thickness thereof.

The term 'length' may denote the dimension in the direction of the cylindrical axis of the rod.

The term 'width' may denote a dimension in a direction substantially perpendicular to a cylindrical axis of the rod.

The rod may be an integral part of the filter portion of the aerosol-generating article. The rod may be an integral part of the aerosol-generating substrate. The rod may comprise a sheet of homogenised tobacco material circumscribed by the wrapping material. Rods may comprise a sheet of homogenised tobacco material advantageously exhibit significantly lower weight standard deviations than rods comprising shreds of tobacco material. The weight of a rod of a particular length may be determined by the density, width and thickness of the sheet of homogenised tobacco material that is gathered to form the rod. The weight of rods of a particular length may be regulated by controlling the density and dimensions of the sheet of homogenised tobacco material. This reduces inconsistencies in weight between rods according to the invention of the same dimensions, and so results in lower rejection rate of rods whose weight falls outside of a selected acceptance range. Rods comprising a sheet of homogenised tobacco material advantageously exhibit more uniform densities than rods comprising shreds of tobacco material.

The inclusion of a gathered sheet of homogenised tobacco material in rods advantageously significantly reduces the risk of loose ends compared to rods comprising shreds of tobacco material.

As used herein, the term 'homogenised tobacco' refers to material formed by agglomerating particulate tobacco. Homogenised tobacco may be in the form of a sheet. Homogenised tobacco material may have an aerosol-former content of greater than 5% on a dry weight basis. Homogenised tobacco material may alternatively have an aerosol former content of between 5% and 30% by weight on a dry weight basis. Sheets of homogenised tobacco material may be formed by agglomerating particulate tobacco obtained by grinding or otherwise combining one or both of tobacco leaf lamina and tobacco leaf stems. Alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof.

The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

The non-liquid aerosol-forming substrate may be deposited on the surface of a carrier in the form of, for example, a sheet, foam, gel or slurry. The non-liquid aerosol-forming substrate may be deposited on the entire surface of the carrier, or alternatively, may be deposited in a pattern in order to provide a non-uniform flavor delivery during use.

Preferably, the non-liquid aerosol-forming substrate comprises cut-filler. In this document, "cut-filler" is used to refer to a blend of shredded plant material, in particular leaf lamina, processed stems and ribs, homogenized plant material, like for example made into sheet form using casting or papermaking processes. The cut filler may also comprise other after-cut, filler tobacco or casing. According to preferred embodiments of the invention, the cut-filler comprises at least 25 percent of plant leaf lamina, more preferably, at least 50 percent of plant leaf lamina, still more preferably at least 75 percent of plant leaf lamina and most preferably at least 90 percent of plant leaf lamina. Preferably, the plant material is one of tobacco, mint, tea and cloves, however, the invention is equally applicable to other plant material that has the ability to release substances upon the application of heat that can subsequently form an aerosol.

Preferably, the tobacco plant material comprises lamina of one or more of bright tobacco lamina, dark tobacco, aromatic tobacco and filler tobacco. Bright tobaccos are tobaccos with a generally large, light coloured leaves. Throughout the specification, the term "bright tobacco" is used for tobaccos that have been flue cured. Examples for bright tobaccos are Chinese Flue-Cured, Flue-Cured Brazil, US Flue-Cured such as Virginia tobacco, Indian Flue-Cured, Flue-Cured from Tanzania or other African Flue Cured. Bright tobacco is characterized by a high sugar to nitrogen ratio. From a sensorial perspective, bright tobacco is a tobacco type which, after curing, is associated with a spicy and lively sensation. According to the invention, bright tobaccos are tobaccos with a content of reducing sugars of between about 2.5 percent and about 20 percent of dry weight base of the leaf and a total ammonia content of less than about 0.12 percent of dry weight base of the leaf. Reducing sugars comprise for example glucose or fructose. Total ammonia comprises for example ammonia and ammonia salts. Dark tobaccos are tobaccos with a generally large, dark coloured leaves. Throughout the specification, the term "dark tobacco" is used for tobaccos that have been air cured. Additionally, dark tobaccos may be fermented. Tobaccos that are used mainly for chewing, snuff, cigar, and pipe blends are also included in this category. Typically, these dark tobaccos are air cured and possibly fermented. From a sensorial perspective, dark tobacco is a tobacco type which, after curing, is associated with a smoky, dark cigar type sensation. Dark tobacco is characterized by a low sugar to nitrogen ratio. Examples for dark tobacco are Burley Malawi or other African Burley, Dark Cured Brazil Galpao, Sun Cured or Air Cured Indonesian Kasturi. According to the invention, dark tobaccos are tobaccos with a content of reducing sugars of less than about 5 percent of dry weight base of the leaf and a total ammonia content of up to about 0.5 percent of dry weight base of the leaf. Aromatic tobaccos are tobaccos that often have small, light coloured leaves. Throughout the specification, the term "aromatic tobacco" is used for other tobaccos that have a high aromatic content, e.g. of essential oils. From a sensorial perspective, aromatic tobacco is a tobacco type which, after curing, is associated with spicy and aromatic sensation. Examples for aromatic tobaccos are Greek Oriental, Oriental Turkey, semi-oriental tobacco but also Fire Cured, US Burley, such as Perique, Rustica, US Burley or Meriland. Filler tobacco is not a specific tobacco type, but it includes tobacco types which are mostly used to complement the other tobacco types used in the blend and do not bring a specific characteristic aroma direction to the final product. Examples for filler tobaccos are stems, midrib or stalks of other tobacco types. A specific example may be flue cured stems of Flue Cure Brazil lower stalk.

The cut-filler suitable to be used with the present invention generally may resemble to cut-filler used for conventional smoking articles. The cut width of the cut filler preferably is between 0.3 millimeters and 2.0 millimeters, more preferably, the cut width of the cut filler is between 0.5 millimeters and 1.2 millimeters and most preferably, the cut width of the cut filler is between 0.6 millimeters and 0.9 millimeters. The cut width may play a role in the distribution of heat inside the substrate portion of the article. Also, the cut width may play a role in the resistance to draw of the article. Further, the cut width may impact the overall density of the substrate portion.

The strand length of the cut-filler is to some extent a random value as the length of the strands will depend on the overall size of the object that the strand is cut off from. Nevertheless, by conditioning the material before cutting, for example by controlling the moisture content and the overall subtlety of the material, longer strands can be cut. Preferably, the strands have a length of between about 10 millimeters and about 40 millimeters before the strands are formed into the substrate section. Obviously, if the strands are arranged in a substrate section in a longitudinal extension where the longitudinal extension of the section is below 40 millimeters, the final substrate section may comprise strands that are on average shorter than the initial strand length. Preferably, the strand length of the cut-filler is such that between about 20 percent and 60 percent of the strands extend along the full length of the substrate portion. This prevents the strands from dislodging easily from the substrate section.

The weight of the non-liquid aerosol-forming substrate is between 80 milligrams and 400 milligrams, preferably between 150 milligrams and 250 milligrams, more preferably between 170 milligrams and 220 milligrams. This amount of aerosol forming typically allows for sufficient material for the formation of an aerosol. Additionally, in the light of the aforementioned constraints on diameter and size, this allows for a balanced density of the aerosol-forming substrate between energy uptake, resistance to draw and fluid passageways within the substrate section where the substrate comprises plant material.

The non-liquid aerosol-forming substrate portion of the aerosol-generating article may have a length of between 20 mm and 40 mm, preferably between about 25 mm and 35 mm. In some embodiments, the aerosol-forming substrate portion of the aerosol-generating article may have a length of approximately 32 mm. The aerosol-forming substrate portion of the aerosol-generating article may have an external diameter of between approximately 4 mm and approximately 8 mm. For example, the aerosol-forming substrate portion of the aerosol-generating article may have an external diameter of between approximately 5 mm and approximately 6 mm. In some embodiments, the aerosol-forming substrate portion may have an external diameter of around 5.3 mm.

As used herein, the term 'non-liquid aerosol-forming substrate' relates to a substrate capable of releasing volatile compounds that can form an aerosol. The substrate may be non-liquid. The substrate may be provided as a gel. The substrate may be viscous. The substrate may be provided as a viscous gel. Volatile compounds may be released by heating the aerosol-forming substrate. An aerosol-forming substrate may conveniently be part of an aerosol-generating article. The aerosol-forming substrate may be liquid aerosol-forming substrate. The liquid aerosol-forming substrate may comprise other additives and ingredients, such as flavourants. If the aerosol-forming substrate is provided in liquid form, in the liquid aerosol-forming substrate, certain physical properties, for example the vapour pressure or viscosity of the substrate, are chosen in a way to be suitable for use in the aerosol generating system. The liquid preferably comprises a tobacco-containing material comprising volatile tobacco flavour compounds which are released from the liquid upon heating. The liquid may include water, ethanol, or other solvents, plant extracts, nicotine solutions, and natural or artificial flavours. Preferably, the liquid further comprises an aerosol former. Examples of suitable aerosol formers are glycerine and propylene glycol. The liquid aerosol-forming substrate may have a nicotine concentration of between about 0.5% and about 10%, for example about 2%.

If the aerosol-forming substrate is provided in a liquid form, the liquid aerosol-forming substrate may be contained in a liquid storage portion of the aerosol-generating article. The aerosol-generating article may be configured as a cartridge. The liquid storage portion is adapted for storing the liquid aerosol-forming substrate to be supplied to the heating element of the aerosol-generating device. Alternatively, the cartridge itself could comprise a heating element for vaporizing the liquid aerosol-forming substrate. In this case, the aerosol-generating device may not comprise a heating element but only supply electrical energy towards the heating element of the cartridge, when the cartridge is received by the aerosol-generating device. The liquid storage portion may comprise couplings such as self-healing pierceable membranes for facilitating supply of the liquid aerosol-forming substrate towards the heating element. The membranes avoid undesired leaking of the liquid aerosol-forming substrate stored in the liquid storage portion. A respective needle-like hollow tube may be provided to pierce through the membrane. The liquid storage portion may be configured as a replaceable tank or container.

The cartridge may have any suitable shape and size. For example, the cartridge may be substantially cylindrical. The cross-section of the cartridge may, for example, be substantially circular, elliptical, square or rectangular.

The cartridge may comprise a housing. The housing may comprise a base and one or more sidewalls extending from the base. The base and the one or more sidewalls may be integrally formed. The base and one or more sidewalls may be distinct elements that are attached or secured to each other. The housing may be a rigid housing. As used herein, the term 'rigid housing' is used to mean a housing that is self-supporting. The rigid housing of the cartridge may provide mechanical support to the heating element. The cartridge may comprise one or more flexible walls. The flexible walls may be configured to adapt to the volume of the liquid aerosol-forming substrate stored in the cartridge. Preferably, the cartridge comprises, as described above, a liquid storage portion, which may comprise the flexible wall. The cartridge may comprise a rigid housing, while a liquid storage portion comprising a flexible wall may be housed within the rigid housing. The housing of the cartridge may comprise any suitable material. The cartridge may comprise substantially fluid impermeable material. The housing of the cartridge may comprise a transparent or a translucent portion, such that liquid aerosol-forming substrate stored in the cartridge may be visible to a user through the housing. The cartridge may be configured such that aerosol-forming substrate stored in the cartridge is protected from ambient air. The cartridge may be configured such that aerosol-forming substrate stored in the cartridge is protected from light. This may reduce the risk of degradation of the substrate and may maintain a high level of hygiene.

The cartridge may be substantially sealed. The cartridge may comprise one or more outlets for liquid aerosol-forming substrate stored in the cartridge to flow from the cartridge to the aerosol-generating device. The cartridge may comprise one or more semi-open inlets. This may enable ambient air to enter the cartridge. The one or more semi-open inlets may be semi-permeable membranes or one-way valves, permeable to allow ambient air into the cartridge and impermeable to substantially prevent air and liquid inside the cartridge from leaving the cartridge. The one or more semi-open inlets may enable air to pass into the cartridge under specific conditions. The cartridge may be refillable. Alternatively, the cartridge may be configured as a replaceable cartridge. The aerosol-generating device may be configured for receiving the cartridge. A new cartridge may be attached to the aerosol-generating device when the initial cartridge is spent.

The liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a non-liquid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres. The aerosol-generation device preferably comprises means for retaining the liquid.

The venturi element may comprise the airflow channel, wherein the airflow channel may comprise an inlet portion, a central portion and an outlet portion, wherein the inlet portion may be configured converging towards the central portion and the outlet portion may be configured diverging from the central portion.

At the central portion, the pressure of the air or aerosol flowing through the central portion decreases, while the flow velocity increases. The central portion is particularly relevant to define the flow resistance, more preferably the resistance to draw, during a usage experience. For example, if the diameter of the central portion decreases, the draw resistance increases. Generally, the resistance to draw may depend upon the cross-sectional area of the central portion. The cross-sectional area of the central portion may be configured to optimize the resistance to draw to a desired value. A pleasant smoking experience may be influenced in a desired way by choosing a specific diameter or cross-sectional area of the central portion. In some embodiments, the length of the central portion may have some influence on the resistance to draw. For example, if the length of the central portion increases. In some embodiments, a preferred optimised resistance to draw of the venturi element alone may be 5 mmWG to 60 mmWG, preferably between 5 mmWG and 30 mmWG, more preferably between 10 mmWG and 15 mmWG. In some embodiments, a preferred optimised resistance to draw of the venturi element along may be approximately 12 mmWG. In some embodiments, an optimised resistance to draw of the device and consumable together may be between 50 mmWG and 60 mmWG, preferably between 52 mmWG and 56 mmWG.

The angle between the longitudinal axis of the inlet portion and the inner wall of the inlet portion may be referred to as inlet angle. The longitudinal axis of the inlet portion may be identical to the longitudinal axis of the venturi element. The inlet angle may influence a transformation of the vaporized aerosol-forming substrate to an aerosol. The inlet angle may contribute to a pressure change which influences the transformation of the vaporized aerosol-forming substrate to an aerosol. In some embodiments, a smaller inlet angle may be associated with a relatively longer inlet length of the inlet portion. An appropriate inlet angle and inlet length may be selected depending upon the type of aerosol-forming substrate. For example, in some embodiments, a liquid aerosol-forming substrate, such as an e-liquid, may require a relatively smaller inlet angle, whereas a non-liquid aerosol-forming substrate, such as tobacco, may require a relatively larger inlet angle.

The angle between the longitudinal axis of the outlet portion and the inner wall of the outlet portion may be referred to as outlet angle. The longitudinal axis of the outlet portion may be identical to the longitudinal axis of the venturi element.

The outlet angle may influence delivery zone of the aerosol. A delivery zone may be a region along a user's oral cavity. A delivery zone may be a region generally positioned along a longitudinal axis along a user's oral cavity. For example, a delivery zone may be a tip of the user's tongue, a middle of a user's tongue, a back of a user's tongue or a back of a user's throat, or any other perceivable regions along the user's oral cavity.

The vaporized aerosol-forming substrate, may be transformed into aerosol. The spatial distance, which the vaporized aerosol-forming substrate covers until it is transformed to aerosol, may be referred to as the vapor path. This transformation may take place in the airflow channel of the venturi element. The vapor path may be influenced by pressure change. The pressure change may have an affect on the vapor path. The pressure change may initiate the transformation of the vaporized aerosol-forming substrate to aerosol. The pressure change may be controlled by the inlet angle. The vapor path may neither be too long nor too short. If the vapor path would be too long, the vaporized aerosol-forming substrate may deposit on the inside of the venturi element and may condense there. Condensed aerosol-forming substrate may leak out of the system. Leakage from the system may be unpleasant for a user. On the other hand, if the vapor path would be too short, the vaporized aerosol-forming substrate may not satisfactorily transform to aerosol. The desired vapor path may depend on the type of substrate, particularly whether liquid or non-liquid substrate is used as described below.

The type of vaporized aerosol-forming substrate may influence the vapor path. For example, a liquid aerosol-forming substrate, such as an e-liquid, has a relatively short vapor path. For example, an e-liquid aerosol-forming substrate may have a typical vapor path of approximately 2 mm to 5 mm, such as 3 mm. Comparatively, a non-liquid aerosol-forming substrate, such as tobacco, has a relatively longer vapor path. For example an aerosol-forming substrate comprising tobacco cast leaf may have a vapour path of approximately 10 mm to 15 mm, such as 12 mm.

The outlet angle may influence the vapor path. The vapor path of aerosol exiting the venturi element may be influenced in a desired way by choosing a specific outlet angle.

Aerosol flow trajectory, or at least, delivery zone within a user's oral cavity, may be influenced by the outlet angle. The trajectory or delivery zone of aerosol exiting the venturi element may be influenced in a desired way by choosing a specific outlet angle. Furthermore, the exiting velocity of the aerosol may be influenced by the outlet angle. The exiting velocity may denote the velocity of the aerosol flow when exiting the venturi element. By means of one or more of the trajectory of the aerosol and the velocity of the aerosol leaving the venturi element, the zone of aerosol delivery in a user's mouth may be influenced in a desired way. Thus, the zone of the aerosol delivery may be optimized by the selection of a specific outlet angle. The zone of aerosol delivery may be within the oral cavity of a user. A delivery zone may be a region generally positioned along a longitudinal axis along a user's oral cavity. A delivery zone may be a tip of the user's tongue. A delivery zone may be a middle of a user's tongue. A delivery zone may be a back of a user's tongue. A delivery zone may be a back of a user's throat. A delivery zone may be any other perceivable regions along the user's oral cavity. A delivery zone described as being 'towards the front', 'forwards', 'front of the mouth', 'further forwards', or the like, refers to a delivery zone relatively closer to the user's lips or front teeth, such as incisor teeth in the oral cavity than to the user's rear molars, wisdom teeth or throat of the oral cavity. A delivery zone described as being 'towards the back', 'backwards', 'back of the mouth', 'further backwards' or the like, refers to a delivery zone relatively closer to the user's rear molars, wisdom teeth or throat of the oral cavity than to the user's lips or front teeth, such as incisor teeth.

Some users may find it desirable to receive a delivery experience closer to the front of the mouth. Some users may find it desirable to receive a delivery experience closer to the back of the mouth. This delivery experience may be influenced by the outlet angle. For example, if the outlet angle is large, the flavour of the aerosol may be delivered closer to the back of the back of the mouth of the user. If the outlet angle is large, the aerosol delivery may provide more of a throaty mouth feel. If the outlet angle is small, the flavour of the aerosol may be delivered closer to the front of the mouth of the user.

In some embodiments, if the outlet angle is large, the length of the outlet portion is shorter. The exiting velocity of the aerosol may be high. Thus, the delivery experience may be closer to the back of the throat of the user. In some embodiments, if the outlet angle is small, the length of the outlet portion is larger. The exiting velocity of the aerosol may be low.

The inlet portion may be configured converging towards the central portion with an inlet angle of between 1° and 20°, preferably 16° and 20°, more preferably between 17° and 19°, most preferably 18°. This inlet angle is particularly preferred if a non-liquid aerosol-forming substrate is used. In an alternative embodiment of the invention the inlet portion may be configured converging towards the central portion with an inlet angle of between 1° and 20°, preferably between 5 to 15°, more preferably between 8 to 11°, most preferred 9.5°.

The outlet portion may be configured diverging from the central portion with an outlet angle of between 2° and 10°, preferably between 4° and 8°, more preferably 6°. This outlet angle is particularly preferred if a non-liquid aerosol-forming substrate is used. In an alternative embodiment of the invention the outlet portion may be diverging from the central portion with an outlet angle of between 2° and 10°, preferably between 3° and 6°, more preferably 4.4°.

If the aerosol-generating article comprises non-liquid aerosol-forming substrate, these specific inlet and outlet angles have proved to be advantageous. After vaporization of the non-liquid aerosol-forming substrate, the droplet size or droplet size distribution of the created aerosol may be optimized by choosing the above specified inlet angle.

In some embodiments, the vapor path, using non-liquid aerosol-forming substrate, may be between 10 mm and 14 mm, preferably between 11 mm and 13 mm, more preferably 12 mm. The transformation of vaporized non-liquid aerosol-forming substrate may take place in one or more of the cooling portion of the aerosol-generating article and in the venturi element, preferably in the airflow channel of the venturi element, more preferably in the inlet portion of the venturi element. Preferably, the transformation takes place partly in the cooling portion and partly in the venturi element. The vapor path may thus be partly in the aerosol-generating article and partly in the venturi element. After vaporization of the non-liquid aerosol-forming substrate, the vapor path may be optimized by choosing the above specified inlet angle. A high pressure change may be utilized in this aspect in the inlet portion of the venturi element. This specific pressure change may be provided by using an inlet angle such as 18°.

In addition to the optimize droplet size by means of the inlet angle, the above specified outlet angle may optimize the desired delivery experience. The inlet portion may be configured converging towards the central portion with an inlet angle of between 2° and 10°, preferably between 4° and 8°, more preferably 6°. This inlet angle is particularly preferred if a liquid aerosol-forming substrate is used.

The outlet portion may be configured diverging from the central portion with an outlet angle of between 16° and 20°, preferably between 17° and 19°, more preferably 18°. This outlet angle is particularly preferred if a liquid aerosol-forming substrate is used.

These specific angles have proved to be advantageous if the aerosol-generating article is an aerosol-generating article comprising liquid aerosol-forming substrate. The vapor path of vaporized liquid aerosol-forming substrate may be shorter than the vapor path of vaporized non-liquid aerosol-forming substrate. The vapor path, using liquid aerosol-forming substrate, may be between 1 mm and 4 mm, preferably between 2 mm and 3 mm. The transformation of vaporized liquid aerosol-forming substrate may take place in the venturi element, preferably in the airflow channel of the venturi element, more preferably in the inlet portion of the venturi element. In the aspect using liquid aerosol-forming substrate, the vapor path may be shorter in comparison to the case that a non-liquid aerosol-substrate is used. A vapor path, for example, between 2 mm and 3 mm, may be provided by a specific pressure change. In some embodiments, the specific pressure change may be a relatively low pressure change. This specific pressure change may be provided by using a specific inlet angle as described herein such as 6°. Such an inlet angle may be sufficient to optimize the vapor path of the vaporized liquid aerosol-forming substrate.

In addition to the optimized droplet size by means of the inlet angle, the above specified outlet angle may optimize the desired delivery experience.

The axial length of the inlet portion, using an aerosol-generating article with non-liquid aerosol-forming substrate, may be between 3 mm and 10 mm, preferably between 5 mm and 9 mm, more preferably 7.7 mm. In an alternative embodiment of the invention, the axial length of the inlet portion may be between 1 mm and 10 mm, preferably between 2 mm and 7 mm, more preferably between 2.5 mm and 4 mm, most preferred 3 mm.

The axial length of the outlet portion may be between 14 mm and 35 mm, preferably between 19 mm and 28 mm, more preferably 23 mm. In an alternative embodiment of the invention, the axial length of the outlet portion may be between 10 mm and 50 mm, preferably between 14 mm and 35 mm, more preferably between 20 mm and 30 mm, most preferably 26 mm.

The axial length of the inlet portion, using an aerosol-generating article with liquid aerosol-forming substrate, may be between 14 mm and 35 mm, preferably between 19 mm and 28 mm, more preferably 23 mm.

The axial length of the outlet portion, using an aerosol-generating article with liquid aerosol-forming substrate, may be between 3 mm and 10 mm, preferably between 5 mm and 9 mm, more preferably 7.7 mm.

The axial length of the central portion, using an aerosol-generating article with non-liquid aerosol-forming substrate or with liquid aerosol-forming substrate, may be between 2 mm and 5 mm, preferably between 3 mm and 4 mm, more preferably 3.2 mm. Particularly preferred is that the central portion is constituted by the transition between the inlet portion and the outlet portion. In some embodiments, the central portion may have no substantial length, or, for example, less than 1 mm. In an alternative embodiment of the invention, the axial length of the central portion may be between 0 mm and 8 mm, preferably below 6 mm, more preferably below 2 mm, most preferred below 1 mm.

The inner diameter of the central portion, using an aerosol-generating article with non-liquid aerosol-forming substrate or with liquid aerosol-forming substrate, may be between 0.5 mm and 1.5 mm, preferably between 0.8 mm and 1.2 mm, more preferably 1 mm. In an alternative embodiment of the invention, the inner diameter of the central portion is between 0.5 mm and 5 mm, preferably between 1 mm and 4 mm, more preferably between 1.5 mm and 3 mm, most preferred 2 mm.

The maximum inner diameter of the inlet portion may be between 1 mm and 10 mm, preferably between 2 mm and 5 mm, more preferably between 2.5 mm and 4 mm, most preferred 3 mm.

The maximum inner diameter of the outlet portion is between 3 mm and 15 mm, preferably between 4 mm and 10 mm, more preferably between 5 mm and 7 mm, most preferred 6 mm.

The outlet portion may comprise threads. The threads may preferably comprise helical threads. The threads may be configured for creating a swirling airflow. The threads may create vortices. The threads may be arranged on the inner wall of the outlet portion. The threads may be arranged along the whole length of the outlet portion. The threads may be arranged along parts of the outlet portion, preferably adjacent to the downstream end of the outlet portion. The pitch of the threads may be between 1 mm and 7 mm, preferably around 5 mm.

The venturi element may comprise a central axial tube having a relatively smaller outer diameter than the diameter of the central portion. The central axial tube may start at the start of the inlet portion, seen from the upstream end of the venturi element towards the downstream end of the venturi element. The central axial tube may run through the entire length of the venturi element. The central axial tube may extend through the inlet portion, the central portion and the outlet portion. The central axial tube may end and at the end of the central portion, seen from the upstream end towards the downstream end. The central axial tube may start at the central portion and end at the end of the outlet portion. The central axial tube may be elongate. The central axial tube may have a cylindrical shape. The central axial tube is preferably hollow. The central axial tube is preferably arranged along the longitudinal axis of the venturi element. The central axial tube is preferably arranged such that air can flow through the central axial tube towards the downstream end of the venturi element. The central axial tube is preferably arranged such that air can flow around the central axial tube through the central portion and into the outlet portion and subsequently out of the venturi element. The central axial tube is preferably arranged such that two flow paths are created, one through the central axial tube, and one around the central axial tube. If the central axial tube extends all the way through the inlet portion, the central portion and the outlet portion, the air flowing through the central axial tube may be directly delivered to a user's mouth independently of the air flowing around the central axial tube. Alternatively, if the central axial tube ends at the end of the central portion, the air flowing out from the central axial tube may merge with the air flowing around the central axial tube in the outlet portion. The central axial tube preferably has a constant diameter. The central axial tube is preferably configured such that air flowing through the central axial tube flows in a laminar flow.

The venturi element may comprise a propeller at or downstream the outlet portion. The propeller may create a pleasant mouth fullness in the mouth of a user. The propeller may have between 2 and 6 blades, preferably 3 blades. The propeller pitch may be between 1 mm and 10 mm, preferably around 6 mm. The propeller pitch may be defined as the displacement a propeller makes in a complete spin of 360° degrees in a hypothetical solid material. The propeller may be integrally formed with the venturi element. The propeller may be provided as a separate element connectable with the venturi element. The outlet portion may comprise attachment means for attaching the propeller to the outlet portion. The attachment means may be provided by a groove for nut. The propeller may be attached to the outlet portion by a snap-fit connection. The propeller may be made from the same material as the venturi element. The central axis of the propeller may be aligned along the longitudinal axis of the venturi element.

A propeller may be combined with a central axial tube as described above. In this embodiment, the central axial tube preferably starts at the central portion, seen from an upstream direction towards a downstream direction. The central axial tube preferably extends all the way up to the ends of the outlet portion so that air flowing through the central axial tube may exit the central axial tube directly into the mouth of a user. In this embodiment, the propeller may be arranged around the central axial tube, preferably adjacent to the downstream end of the outlet portion. The propeller may optimize the airflow of the air flowing around the central axial tube. The propeller may be arranged stationary or freely rotatable.

The venturi element may comprise a ventilation hole. The ventilation hole may be arranged at one or more of the inlet portion, the central portion and the outlet portion. More than one ventilation hole may be provided. The ventilation hole may create a fluid connection between the outside of the venturi element with the respective portion of the venturi element, at which the ventilation hole is arranged. Preferably, the ventilation hole is arranged in the central portion. This arrangement may have the advantage that air is drawn from outside of the venturi element into the central portion, in which the air may mix with the airflow through the venturi element. Air may be drawn from outside of the venturi element into the central portion, since the air pressure in the central portion may be lower than the air pressure outside of the venturi element due to the venturi effect. The mixture of outside air with airflow coming from the substrate portion of the aerosol-generating article may create an optimized aerosol.

The venturi element may comprise a second airflow channel parallel to the first airflow channel. The venturi element may comprise a second inlet portion, a second central portion and a second outlet portion. The second inlet portion may be configured converging towards the second central portion and the second outlet portion may be configured diverging from the second central portion.

The second inlet portion, the second central portion and the second outlet portion may form the second airflow channel. The second airflow channel may be arranged parallel to the first airflow channel. The first and second airflow channels may be arranged parallel to the longitudinal axis of the venturi element. Air flowing through the first airflow channel may merge with the air flowing through the second airflow channel at or after the downstream end of the venturi element. Air being drawn from the substrate portion or a filter portion of the aerosol-generating article and entering the venturi element may be split between the first airflow channel and the second airflow channel. With regard to the dimensions of the second airflow channel, the second airflow channel may be configured similar to the first airflow channel as described above, but in a flipped configuration. In other words, the second airflow channel may have the shape of a reversed first airflow channel.

If two airflow channels are provided, a common upstream portion may be provided for splitting the airflow between the inlet portions of the first and second airflow channels. The common upstream portion may be arranged between the substrate portion or filter portion of the aerosol-generating article and the airflow channels. The common upstream portion may be arranged within the venturi element. By providing two airflow channels, an optimized resistance to draw (RTD) may be achieved. In some embodiments, a preferred optimised resistance to draw of the venturi element alone may be 5 mmWG to 60 mmWG, preferably between 5 mmWG and 30 mmWG, more preferably between 10 mmWG and 15 mmWG. In some embodiments, a preferred optimised resistance to draw of the venturi element along may be approximately 12 mmWG. In some embodiments, an optimised resistance to draw of the device and consumable together may be between 50 mmWG and 60 mmWG, preferably between 52 mmWG and 56 mmWG. A greater mouth fullness may be affected by providing two airflow channels. The sensorial experience and delivery profile of the usage experience may be adjusted by adjustment by the structure of the two airflow channels.

If the aerosol-generating article comprises non-liquid aerosol-forming substrate, the inlet portion of the second airflow channel may be converging towards the central portion of the second airflow channel with an inlet angle of between 2° and 10°, preferably between 4° and 8°, more preferably 6°. The axial length of the inlet portion may be between 14 mm and 35 mm, preferably between 19 mm and 28 mm, more preferably 23 mm. The axial length of the central portion may be between 2 mm and 5 mm, preferably between 3 mm and 4 mm, more preferably 3.2 mm. The central portion of the second airflow channel may have an axial length of around 1.6 mm. The outlet portion of the second airflow channel may be configured diverging from the central portion of the venturi element with an outlet angle of between 16° and 20°, preferably between 17° and 19°, more preferably between 18°. The axial length of the outlet portion may be between 3 mm and 10 mm, preferably between 5 mm and 9 mm, more preferably 7.7 mm.

If the aerosol-generating article comprises liquid aerosol-forming substrate, the inlet portion of the second airflow channel may be converging towards the central portion of the second airflow channel with an inlet angle of between 16° and 20°, preferably between 17° and 19°, more preferably 18°. The axial length of the inlet portion may be between 3 mm and 10 mm, preferably between 5 mm and 9 mm, more preferably 7 mm. The axial length of the central portion may be between 2 mm and 5 mm, preferably between 3 mm and 4 mm, more preferably 3.2 mm. The central portion of the second airflow channel may have an axial length of around 1.6 mm. The outlet portion of the second airflow channel may be configured diverging from the central portion of the venturi element with an outlet angle of between 2° and 10°, preferably between 4° and 8°, more preferably 6°. The axial length of the outlet portion may be between 14 mm and 35 mm, preferably between 19 mm and 28 mm, more preferably 23 mm.

The venturi element, comprising two airflow channels with the configurations described above, may be used as a universal venturi element. The universal venturi element may be used with an aerosol-generating article comprising non-liquid aerosol-forming substrate. The universal venturi element may be used with an aerosol-generating article comprising liquid aerosol-forming substrate.

In the venturi element comprising two airflow channels with the configurations described above, each of the airflow channels may be configured closable. The airflow channels may be configured independently closable. Closing of an airflow channel may prevent airflow through the channel. The closing of one of the airflow channels may be facilitated manually. The closing of one of the airflow channels may be facilitated automatically. A detector may be provided for detecting the type of aerosol-forming substrate. If an aerosol-generating article comprising non-liquid aerosol-forming substrate is used, the airflow channel with an inlet angle lower than the outlet angle as described above may be used and the other airflow channel may be closed or vice versa.

If each airflow channel is open, the universal venturi element may be used with an aerosol-generating article comprising liquid aerosol-forming substrate and non-liquid aerosol-forming substrate. In this aspect, the liquid and the non-liquid aerosol-forming substrate could be heated in parallel.

The invention may further relate to a venturi element for use with an aerosol-generating article comprising aerosol-forming substrate. The venturi element may comprise an airflow channel. The airflow channel may comprise an inlet portion, a central portion and an outlet portion. The inlet portion is configured converging towards the central portion and the outlet portion is configured diverging from the central portion.

The axial length of the central portion may be between 2 mm and 5 mm, preferably between 3 mm and 4 mm, more preferably 3.2 mm. Particularly preferred is that the central portion is constituted by the transition between the inlet portion and the outlet portion. The central portion may have no substantial length.

The inner diameter of the central portion may be between 0.5 mm and 1.5 mm, preferably between 0.8 mm and 1.2 mm, more preferably 1 mm.

The inlet portion may be configured converging towards the central portion with an inlet angle of between 16° and 20°, preferably between 17° and 19°, more preferably 18°. This inlet angle is particularly preferred if a non-liquid aerosol-forming substrate is used.

The outlet portion may be configured diverging from the central portion with an outlet angle of between 2° and 10°, preferably between 4° and 8°, more preferably 6°. This outlet angle is particularly preferred if a non-liquid aerosol-forming substrate is used.

The axial length of the inlet portion, using an aerosol-generating article with non-liquid aerosol-forming substrate, may be between 3 mm and 10 mm, preferably between 5 mm and 9 mm, more preferably 7.7 mm.

The axial length of the outlet portion, using an aerosol-generating article with non-liquid aerosol-forming substrate, may be between 14 mm and 35 mm, preferably between 19 mm and 28 mm, more preferably 23 mm.

If the aerosol-generating article comprising liquid aerosol-forming substrate, the inlet portion may be configured converging towards the central portion with an inlet angle of between 2° and 10°, preferably between 4° and 8°, more preferably 6°.

The outlet portion, using an aerosol-generating article with liquid aerosol-forming substrate, may be configured diverging from the central portion with an outlet angle of between 16° and 20°, preferably between 17° and 19°, more preferably 18°.

The axial length of the inlet portion, using an aerosol-generating article with liquid aerosol-forming substrate, may be between 14 mm and 35 mm, preferably between 19 mm and 28 mm, more preferably 23 mm.

The axial length of the outlet portion, using an aerosol-generating article with liquid aerosol-forming substrate, may be between 3 mm and 10 mm, preferably between 5 mm and 9 mm, more preferably 7.7 mm.

The outlet portion may comprise threads. The threads may preferably comprise helical threads. The threads may be configured for creating a swirling airflow. The threads may create vortices. The threads may be arranged on the inner wall of the outlet portion. The threads may be arranged along the whole length of the outlet portion. The threads may be arranged along parts of the outlet portion, preferably adjacent to the downstream end of the outlet portion. The pitch of the threads may be between 1 mm and 7 mm, preferably around 5 mm.

The venturi element may comprise a central axial tube having a relatively smaller outer diameter than the diameter of the central portion. The central axial tube may start at the start of the inlet portion, seen from the upstream end of the venturi element towards the downstream end of the venturi element. The central axial tube may run through the entire length of the venturi element. The central axial tube may extend through the inlet portion, the central portion and the outlet portion. The central axial tube may end and at the end of the central portion, seen from the upstream end towards the downstream end. The central axial tube may start at the central portion and end at the end of the outlet portion. The central axial tube may be elongate. The central axial tube may have a cylindrical shape. The central axial tube is preferably hollow. The central axial tube is preferably arranged along the longitudinal axis of the venturi element. The central axial tube is preferably arranged such that air can flow through the central axial tube towards the downstream end of the venturi element. The central axial tube is preferably arranged such that air can flow around the central axial tube through the central portion and into the outlet portion and subsequently out of the venturi element. The central axial tube is preferably arranged such that two flow paths are created, one through the central axial tube, and one around the central axial tube. If the central axial tube extends all the way through the inlet portion, the central portion and the outlet portion, the air flowing through the central axial tube may be directly delivered to a user's mouth independently of the air flowing around the central axial tube. Alternatively, if the central axial tube ends at the end of the central portion, the air flowing out from the central axial tube may merge with the air flowing around the central axial tube in the outlet portion. The central axial tube preferably has a constant diameter. The central axial tube is preferably configured such that air flowing through the central axial tube flows in a laminar flow.

The venturi element may comprise a propeller at or downstream the outlet portion. The propeller may create a pleasant mouth fullness in the mouth of a user. The propeller may have between 2 and 6 blades, preferably 3 blades. The propeller pitch may be between 1 mm and 10 mm, preferably around 6 mm. The propeller pitch may be defined as the displacement a propeller makes in a complete spin of 360° degrees in a hypothetical solid material. The propeller may be integrally formed with the venturi element. The propeller may be provided as a separate element connectable with the venturi element. The outlet portion may comprise attachment means for attaching the propeller to the outlet portion. The attachment means may be provided by a groove for nut.

The propeller may be attached to the outlet portion by a snap-fit connection. The propeller may be made from the same material as the venturi element. The central axis of the propeller may be aligned along the longitudinal axis of the venturi element.

A propeller may be combined with a central axial tube as described above. In this embodiment, the central axial tube preferably starts at the central portion, seen from an upstream direction towards a downstream direction. The central axial tube preferably extends all the way up to the ends of the outlet portion so that air flowing through the central axial tube may exit the central axial tube directly into the mouth of a user. In this embodiment, the propeller may be arranged around the central axial tube, preferably adjacent to the downstream end of the outlet portion. The propeller may optimize the airflow of the air flowing around the central axial tube. The propeller may be arranged stationary or freely rotatable.

The venturi element may comprise a ventilation hole. The ventilation hole may be arranged at one or more of the inlet portion, the central portion and the outlet portion. More than one ventilation hole may be provided. The ventilation hole may create a fluid connection between the outside of the venturi element with the respective portion of the venturi element, at which the ventilation hole is arranged. Preferably, the ventilation hole is arranged in the central portion. This arrangement may have the advantage that air is drawn from outside of the venturi element into the central portion, in which the air may mix with the airflow through the venturi element. Air may be drawn from outside of the venturi element into the central portion, since the air pressure in the central portion may be lower than the air pressure outside of the venturi element due to the venturi effect. The mixture of outside air with airflow along the longitudinal axis of the venturi element may create an optimized aerosol.

The venturi element may comprise a second airflow channel parallel to the first airflow channel. The venturi element may comprise a second inlet portion, a second central portion and a second outlet portion. The second inlet portion may be configured converging towards the second central portion and the second outlet portion may be configured diverging from the second central portion.

The second inlet portion, the second central portion and the second outlet portion may form the second airflow channel. The second airflow channel may be arranged parallel to the first airflow channel. The first and second airflow channels may be arranged parallel to the longitudinal axis of the venturi element. Air flowing through the first airflow channel may merge with the air flowing through the second airflow channel at or after the downstream end of the venturi element. Air entering the venturi element may be split between the first airflow channel and the second airflow channel. With regard to the dimensions of the second airflow channel, the second airflow channel may be configured similar to the first airflow channel as described above, but in a flipped configuration. In other words, the second airflow channel may have the shape of a reversed first airflow channel. If the aerosol-generating article comprises non-liquid aerosol-forming substrate, the inlet portion of the second airflow channel may be converging towards the central portion of the second airflow channel with an inlet angle of between 2° and 10°, preferably between 4° and 8°, more preferably 6°. The axial length of the inlet portion may be between 14 mm and 35 mm, preferably between 19 mm and 28 mm, more preferably 23 mm. The axial length of the central portion may be between 2 mm and 5 mm, preferably between 3 mm and 4 mm, more preferably 3.2 mm. The central portion of the second airflow channel may have an axial length of around 1.6 mm. The outlet portion of the second airflow channel may be configured diverging from the central portion of the venturi element with an outlet angle of between 16° and 20°, preferably between 17° to 19°, more preferably 18°. The axial length of the outlet portion may be between 3 mm and 10 mm, preferably between 5 mm and 9 mm, more preferably between 7.7 mm.

If the aerosol-generating article comprises liquid aerosol-forming substrate, the inlet portion of the second airflow channel may be converging towards the central portion of the second airflow channel with an inlet angle of between 16° and 20°, preferably between 17° and 19°, more preferably 18°. The outlet portion of the second airflow channel may be configured diverging from the central portion of the venturi element with an outlet angle of between 2° and 10°, preferably between 4° to 8°, more preferably 6°.

The axial length of the inlet portion may be between 3 mm and 10 mm, preferably between 5 mm and 9 mm, more preferably 7.7 mm. The axial length of the central portion may be between 2 mm and 5 mm, preferably between 3 mm and 4 mm, more preferably 3.2 mm. The central portion of the second airflow channel may have an axial length of around 1.6 mm. The axial length of the outlet portion may be between 14 mm and 35 mm, preferably between 19 mm and 28 mm, more preferably 23 mm.

If two airflow channels are provided, a common upstream portion may be provided for splitting the airflow between the inlet portions of the first and second airflow channels. The common upstream portion may be arranged within the venturi element. By providing two airflow channels, an optimized resistance to draw (RTD) may be achieved. In some embodiments, a preferred optimised resistance to draw of the venturi element alone may be 5 mmWG to 60 mmWG, preferably between 5 mmWG and 30 mmWG, more preferably between 10 mmWG and 15 mmWG. In some embodiments, a preferred optimised resistance to draw of the venturi element along may be approximately 12 mmWG. In some embodiments, an optimised resistance to draw of the device and consumable together may be between 50 mmWG and 60 mmWG, preferably between 52 mmWG and 56 mmWG. A greater mouth fullness may be affected by providing two airflow channels. The sensorial experience and delivery profile of the usage experience may be adjusted by adjustment by the structure of the two airflow channels.

The invention further relates to a kit of venturi elements for use in an aerosol-generating system as described herein. Each venturi element is configured removably attachable to one or both of an aerosol-generating article as described herein and an aerosol-generating device as described herein. Each of the venturi elements is configured with different characteristics.

The different characteristics may be realized by the structural configuration of the venturi elements. Each of the venturi elements of the kit of venturi elements may be configured as described herein, particularly comprising an inlet portion, a central portion and an outlet portion as described herein.

The term 'characteristics' may denote one or more of physical properties of the venturi element and mechanical properties of the venturi element. Physical properties may be velocity or pressure. Different velocities or pressures, preferably pressure change, may facilitate different aerosol flows and different spatial distances of the vapor path. Mechanical properties may be the dimension, material and/or design of the venturi element. Different dimensions of the venturi element may configured by different lengths of one or more of the inlet portion, central portion and outlet portion. Different dimensions of the venturi element may be configured by different angles of one or more of the inlet portions and the outlet portions. The different characteristics may arise from different configurations of the airflow channels of the individual venturi elements, preferably of the inlet and outlet portions, more preferably of the inlet and outlet angles. Different materials of the venturi elements may have different frictional coefficients. Different frictional coefficient may facilitate different aerosol flow rates. Different designs of the venturi elements may be a double venturi element or a propeller within the venturi element or one of the designs described herein.

The different characteristics of the venturi element may facilitate different aerosol generations. The characteristics may define the usage experience. The outlet angles of each of the venturi elements may differ by at least 0.5°, preferably by at least 1°, more preferably by at least 2°, most preferred by 2°. In this case, the kit of venturi elements may be configured for use with one or more aerosol-generating articles comprising aerosol-forming substrate, preferably a non-liquid aerosol-forming substrate.

The inlet angles of each of the venturi elements may differ by at least 0.5°, preferably by at least 1°, more preferably by at least 2°, most preferred by 2°. In this case, the kit of venturi elements may be configured for use with one or more aerosol-generating articles comprising aerosol-forming substrate, preferably liquid aerosol-forming substrate.

In some embodiments, the kit of venturi elements may be configured for use with a variety of aerosol-forming substrates. For example, one or more of the venturi elements in the kit may be configured for use with a liquid aerosol-forming substrate and another one or more of the venturi elements in the kit may be configured for use with a non-liquid aerosol-forming substrate.

One or more venturi elements in the kit may comprise one or more different options. One of the options is that the venturi element may comprises threads at the outlet portion. A further option is that the venturi element comprises a central axial tube having a relatively smaller outer diameter than the diameter of the central portion. Another option is that the venturi element comprises a propeller at or downstream the outlet portion or a ventilation hole of the venturi element. The venturi element may comprise a second airflow channel parallel to the first airflow channel as a further option. Therefore, the venturi element may comprise a second inlet portion, a second central portion and a second outlet portion, wherein the second inlet portion may be configured converging towards the second central portion and the second outlet portion may be configured diverging from the second central portion.

In the kit of venturi elements, at least one venturi element comprises at least one of the above options and at least one different venturi element comprises at least one different of the above options.

For example, one venturi element of the kit of venturi elements may comprise threads at the outlet portion and another venturi element of the kit of venturi elements may comprise a propeller at or downstream the outlet portion.

The different options and different configurations, particularly the different inlet and outlet angles, of the venturi elements in the kit of venturi elements may result in different usage experiences. A user may select his/her desired usage experience by selecting a corresponding venturi element from the kit of venturi elements. The selected venturi element may then be attached to the aerosol-generating article by the user. The venturi elements in the kit of venturi elements may be provided with different markers corresponding to the different usage experiences. The markers may be haptic or optical markers. A haptic marker may be a marker with a specific surface structure. An optical marker may be colored marker. The individual market may correspond to a specific usage experience such as a small usage experience or a strong usage experience. The markers may be provided with different colors or different surface structures or a combination thereof for enabling identification of the markers.

The kit of venturi elements may be contained in a package comprising the different venturi elements. The package of the venturi elements may comprise a marker as described above, for example a haptic marker or an optical marker, for enabling identification of the enclosed venturi elements.

The kit of venturi elements for aerosol-generating articles comprising non-liquid aerosol-forming substrate may differ from the kit of venturi elements for aerosol-generating articles comprising liquid aerosol-forming substrate. For example, the venturi elements for aerosol-generating articles comprising non-liquid aerosol-forming substrate may differ from venturi elements for aerosol-generating articles comprising liquid aerosol-forming substrate by different markers.

The invention may further relate to a method for manufacturing a venturi element for use with an aerosol-generating article comprising aerosol-forming substrate, wherein the method comprises:

i. providing a venturi element comprising an airflow channel, wherein the airflow channel may comprise an inlet portion, a central portion and an outlet portion, wherein the inlet portion is configured converging towards the central portion and the outlet portion is configured diverging from the central portion. If the aerosol-generating article comprises non-liquid aerosol-forming substrate, the inlet portion may be configured converging towards the central portion with an inlet angle of between 16° and 20°, preferably of between 17° to 19°, more preferably of 18°. If the aerosol-generating article comprises liquid aerosol-forming substrate, the inlet portion may be configured converging towards the central portion with an inlet angle of between 2° and 10°, preferably of between 4° and 8°, more preferably of 6°.

The method may comprise the step of attaching the venturi element to the aerosol-generating article. If the aerosol-generating article comprises a hollow filter portion, the method may comprise the step of inserting the venturi element into the hollow filter portion of the aerosol-generating article. The venturi element may comprise a connection element. The method may comprise inserting the venturi element into the hollow filter portion of the aerosol-generating article. The method may include providing any of the above discussed elements and configurations of the venturi element.

FIG. 1 shows an aerosol-generating article 10 as well as a venturi element 12. The aerosol-generating article 10 comprises a substrate portion 14 as well as a filter portion 16. The filter portion 16 is preferably configured as a hollow acetate tube. Attached to the aerosol-generating article 10, FIG. 1 shows a venturi element 12. The venturi element 12 is in the embodiment shown in FIG. 1 preferably permanently attached to the aerosol-generating article 10, more precisely to the filter portion 16 of the aerosol-generating article 10. An outer wrapper may be provided surrounding the aerosol-generating article 10 and the venturi element 12.

Figure 2:
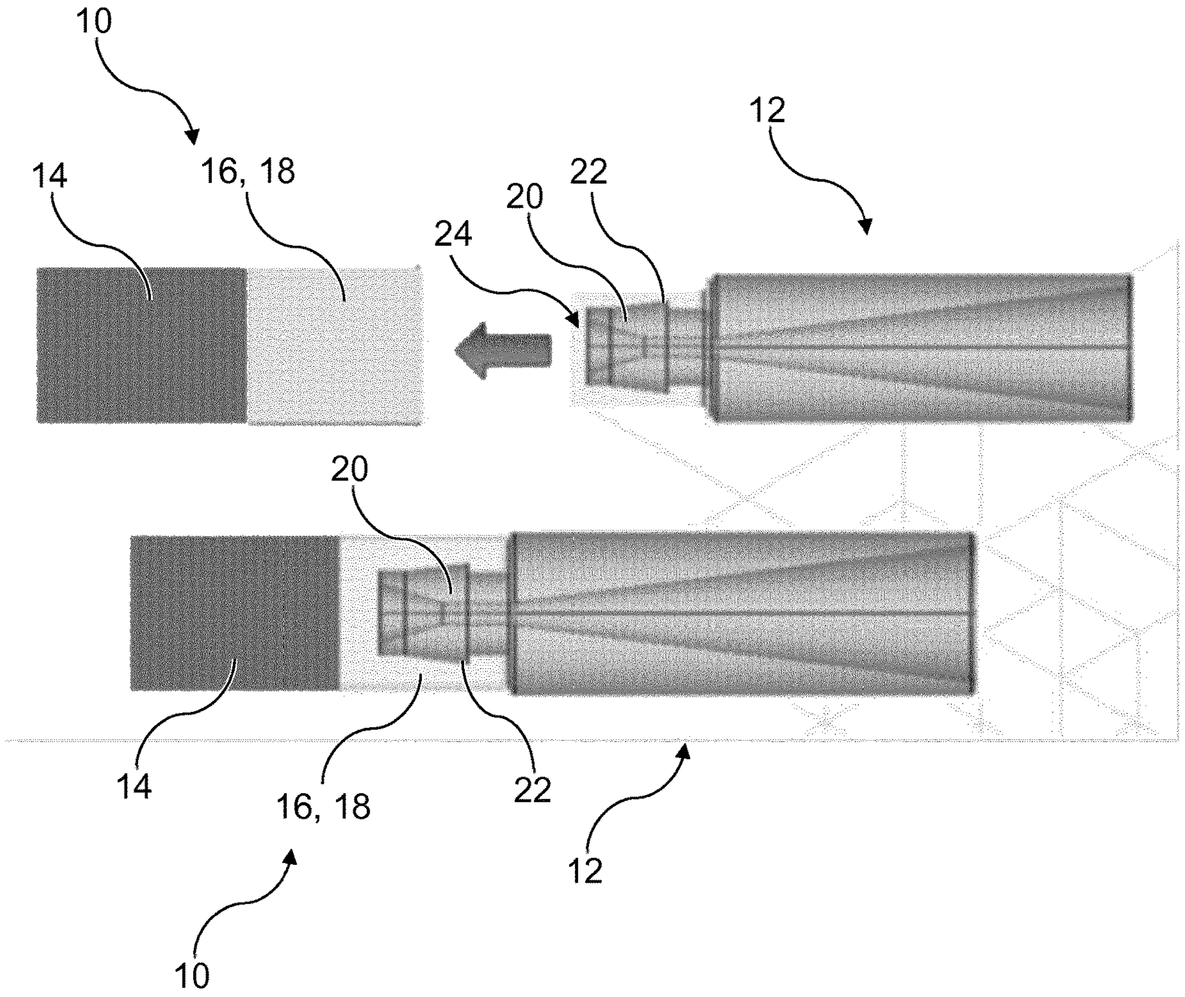
FIG. 2 shows an embodiment, in which the aerosol-generating article and the venturi element are configured detachable by means of a connection portion of the aerosol-generating article and a connection element of the venturi element.

FIG. 2 shows an embodiment, in which the venturi element 12 is configured removably attachable to the aerosol-generating article 10. The filter portion 16 of the aerosol-generating article 10 comprises a connection portion 18 for connecting the venturi element 12 to the aerosol-generating article 10. The connection portion 18 of the aerosol-generating article 10 may also be a filter, preferably a hollow acetate tube. Alternatively, the connection portion 18 of the aerosol-generating article 10 can be provided in addition to a filter portion 16. A filter portion 16 may be arranged between the substrate portion 14 and the connection portion 18.

The venturi element 12 shown in FIG. 2 comprises a connection element 20 for insertion into the connection portion 18 of the aerosol-generating article 10. The connection element 20 of the venturi element 12 preferably has a tapered shape. A step 22 surrounds the outer perimeter of the connection element 20. The tapered configuration of the connection element 20 enables an easy insertion of the connection element 20 of the venturi element 12 into the connection portion 18 of the aerosol-generating article 10. The step 22 surrounding the outer perimeter of the connection element 20 of the venturi element 12 is configured to securely hold the connection element 20 inside of the connection portion 18 of the aerosol-generating article 10. The connection portion 18 of the aerosol-generating article 10 is preferably configured hollow so that the connection element 20 of the venturi element 12 can easily be inserted into the hollow connection portion 18. An upstream end 24 of the connection element 20 of the venturi element 12 preferably has a smaller outer diameter than the inner diameter of the hollow connection portion 18 of the aerosol-generating article 10. The upstream end 24 of the connection element 20 may be the upstream end 24 of the venturi element 12. As can be seen in FIG. 2, the connection element 20 of the venturi element 12 is tapered so that the outer diameter of the connection element 20 of the venturi element 12 increases towards a downstream end. Preferably, the maximum outer diameter of the connection element 20 of the venturi element 12 is larger than the inner diameter of the hollow connection portion 18 of the aerosol-generating article 10. Thus, the connection element 20 of the venturi element 12 is securely held within the hollow connection portion 18 of the aerosol-generating article 10 after insertion of the connection element 20 into the connection portion 18. Retaining the connection element 20 of the venturi element 12 is further aided by the step 22. The inner wall of the hollow connection portion 18 of the aerosol-generating article 10 may comprise elements not shown in FIG. 2 which may interlock with the step 22 of the connection element 20 of the venturi element 12.

Figure 3:
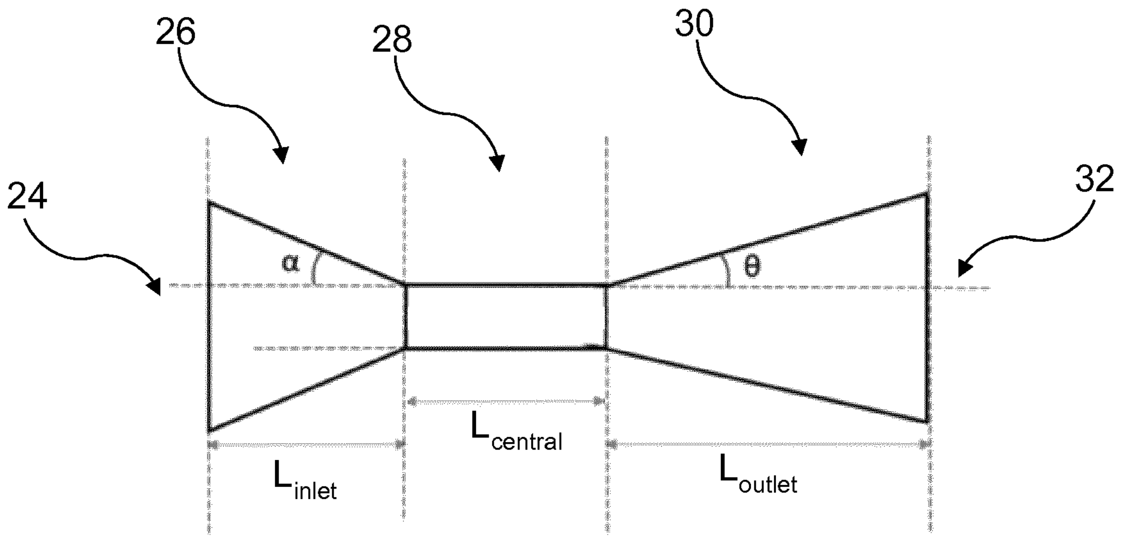
FIG. 3 shows a sectional view of the venturi element.

FIG. 3 shows a sectional view of the venturi element 12. The venturi element 12 comprises an inlet portion 26, a central portion 28 and an outlet portion 30. The inlet portion 26 is tapered towards the central portion 28. In FIG. 3, the inlet portion 26 has a conical shape. The inner diameter of the inlet portion 26 decreases from an upstream end of the venturi element towards a downstream end of the venturi element. The central portion 28 forms a constricted airflow passage for air flowing through the venturi element 12. The axial length $L_{central}$ of the central portion 28 may be between 2 mm and 5 mm, preferably 3.2 mm. The central portion 28 has a constant inner diameter of preferably 2 mm. Downstream of the central portion 28, the outlet portion 30 is arranged. The outlet portion 30 diverges from the central portion 28 towards a downstream end 32 of the venturi element 12. The outlet portion 30 also has a conical shape, however orientated in an opposite direction in comparison to the inlet portion 26.

If the aerosol-generating article comprising aerosol-forming substrate, preferably non-liquid aerosol-forming substrate, the inlet angle $\alpha$ of the inlet portion 26 may be between 16° and 20°, preferably between 17° to 19°, more preferably 18°. The inlet angle is the angle between the longitudinal axis of the inlet portion and the inner wall of the inlet portion. The axial length $L_{inlet}$ of the inlet portion 26 may be between 3 mm and 10 mm, preferably 7.7 mm.

The outlet portion 30 may have an outlet angle $\theta$ of between 2° and 10°, preferably between 4° to 8°, more preferably 6°. The outlet angle is the angle between the longitudinal axis of the outlet portion and the inner wall of the outlet portion. The axial length $L_{outlet}$ of the outlet portion 30 may be between 14 mm and 35 mm, preferably 23 mm. The maximum inner diameter of the outlet portion 30 at the downstream end 32 is, for example, 6 mm.

If the aerosol-generating article comprises liquid aerosol-forming substrate, the dimensions and angles of the venturi element are different from the case that the aerosol-generating article comprises non-liquid aerosol-forming substrate. Preferably, the inlet angle $\alpha$ of the inlet portion 26 may in this case be between 2° and 10°, preferably between 4° to 8°, more preferably 6°. The axial length $L_{inlet}$ of the inlet portion 26 may be between 14 mm and 35 mm, preferably 23 mm. The maximum inner diameter of the inlet portion 26 may be, for example 3 mm. The maximum inner diameter of the outlet portion 30 at the downstream 32 may, for example, be 3 mm. The outlet angle $\theta$ is between 16° and 20°, preferably 18°. The axial length $L_{outlet}$ of the outlet portion 30 may be between 3 mm and 10 mm, preferably 7.7 mm.

The inlet portion 26, the central portion 28 and the outlet portion 30 together form the airflow channel in the venturi element 12 from the upstream end 24 of the venturi element 12 towards a downstream end 32 of the venturi element 12. The downstream end 32 of the venturi element 12 is configured such that a user may take the downstream end 32 of the venturi element 12 between his lips for inhalation of an aerosol formed in the outlet portion 30 of the venturi element 12. The venturi element may comprise an external shape adapted for the purpose of holding the downstream end 32 of the venturi element 12 between lips of a user, e.g. an ergonomic shape for comfort. Air containing vaporized aerosol-forming substrate from the aerosol-generating article 10 may flow into the inlet portion 26 of the venturi element 12. This air is then compressed in the central portion 28, thereby reducing the pressure and increasing the velocity of the air. When the air is drawn out of the central portion 28 and into the outlet portion 30, the air expands and cools down such that optimized droplets can form in the aerosol. The aerosol can then subsequently be inhaled by a user.

Figure 4:
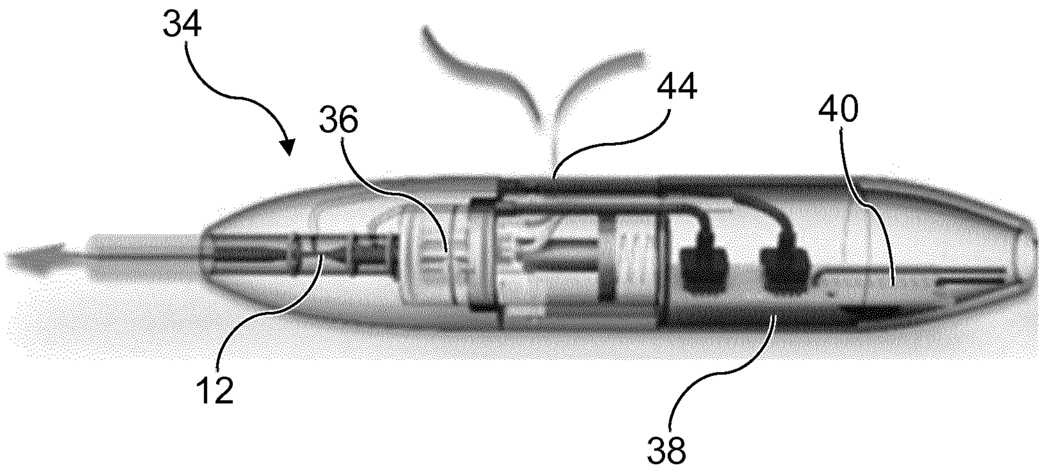
FIG. 4 shows an aerosol-generating device comprising a mouthpiece with a venturi element.

FIG. 4 shows an aerosol-generating device, into which the venturi element 12 may be incorporated. Preferably, the venturi element 12 may be part of a mouthpiece 34 of the aerosol-generating device. The aerosol-generating device comprises further elements such as a heating chamber 36, in or around which a heating element may be provided. The heating element may be powered by a power supply 38. The supply of electrical energy from the power supply 38 to the heater element may be controlled by electric circuitry 40.

Figure 5:
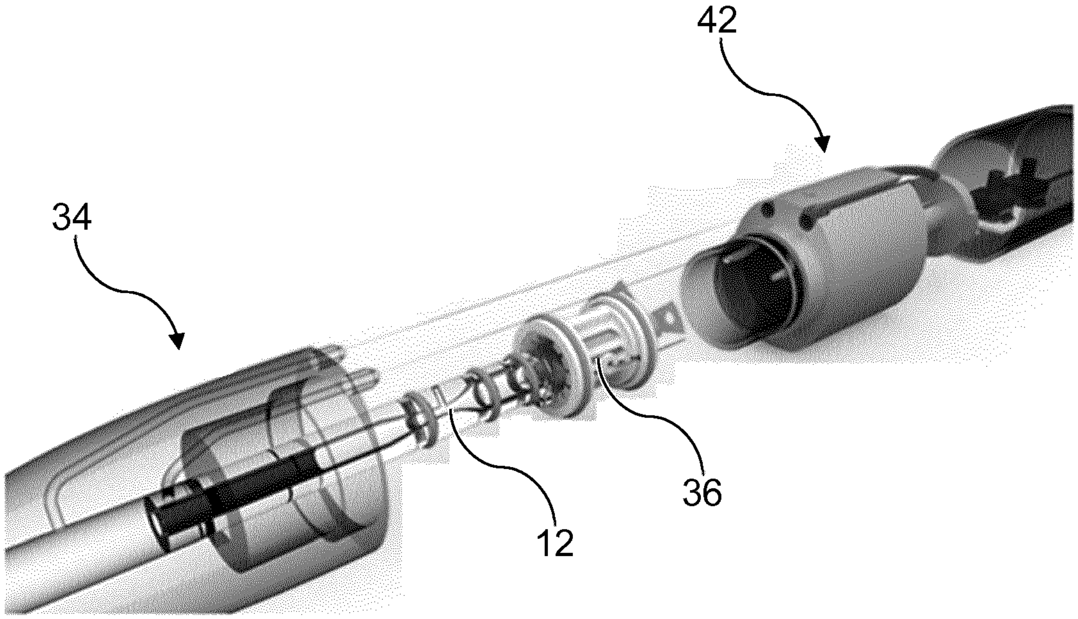
FIG. 5 shows an explosion view of the aerosol-generating device of FIG. 4.

FIG. 5 shows the aerosol-generating device of FIG. 4 in an explosion view. The venturi element 12 is shown to be arranged along the longitudinal axis of the aerosol-generating device. The aerosol-generating device may comprise two main parts: the mouthpiece 34 and a main body 42 of the aerosol-generating device. The mouthpiece 34 may comprise the venturi element 12, while the main body 42 may comprise the further elements such as the power supply 38 and the electric circuitry 40. The heating chamber 36 may be partly formed in the mouthpiece 34 and the main body 42 or in each of one of these main parts. The mouthpiece 34 and the main body 42 may be configured detachable from each other. In the detached state, an aerosol-generating article 10 may be inserted into the heating chamber 36. The mouthpiece 34 may be attached to the main body 42 so that the aerosol-generating article 10 is surrounded or at least partially surrounded or enclosed in the heating chamber 36 by the mouthpiece 34 and the main body 42. The venturi element 12 may then be arranged downstream of the aerosol-generating article 10. The main body 42 of the aerosol-generating device may comprise one or more air inlets 44 which enable ambient air to enter the aerosol-generating device. The air inlet 44 can best be seen in FIG. 4. The air may flow through the one or more air inlets 44 into the heating chamber 36, in which the heating of the air as well of the aerosol-forming substrate contained in the aerosol-generating article 10 takes place. Vaporized aerosol-forming substrate may be entrained in the air flowing through the heating chamber 36. Subsequently, the air containing vaporized aerosol-forming substrate flows through the venturi element 12. The aerosol can then be inhaled by a user downstream of the venturi element 12.

Figure 6:
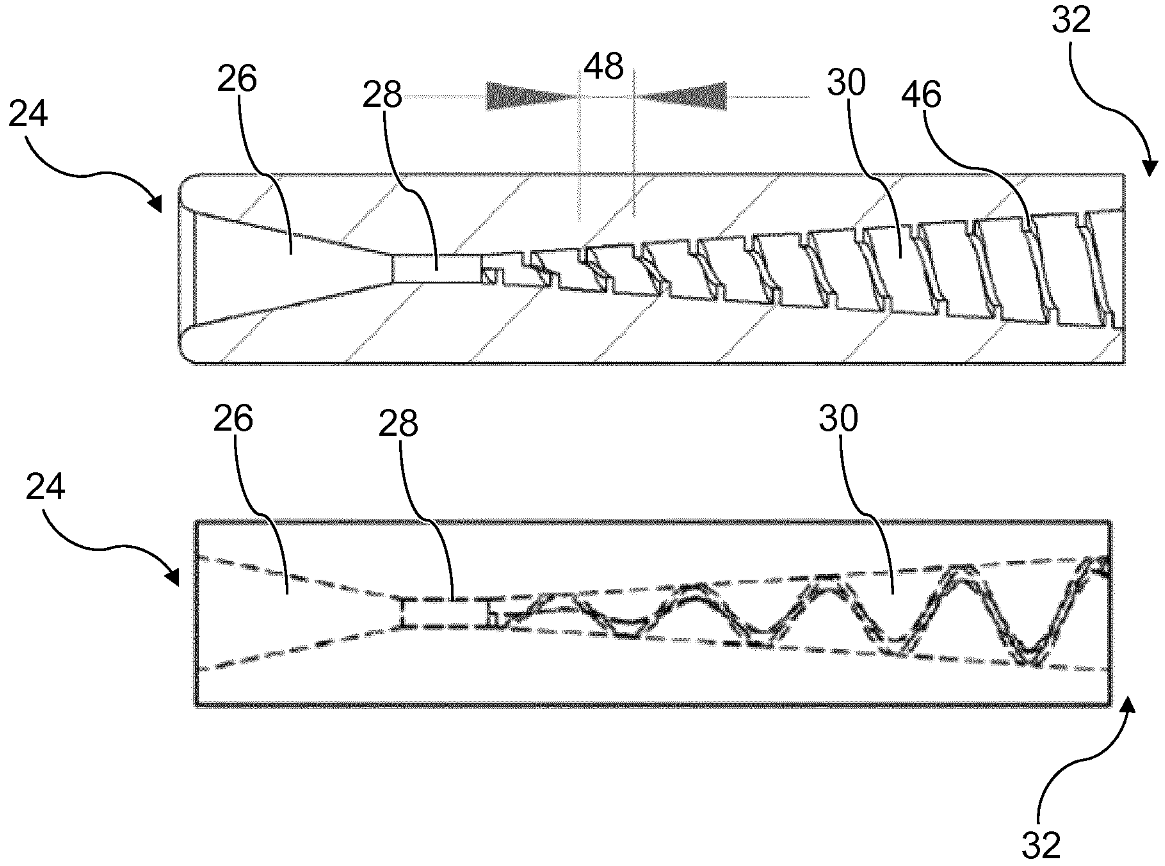
FIG. 6 shows an embodiment of the venturi element with threads in the outlet portion.

FIG. 6 shows an embodiment of the venturi element 12, in which the outlet portion 30 of the venturi element 12 has threads 46. The threads 46 are preferably configured as helical threads 46. The pitch 48 of the threads 46 is indicated in FIG. 6 and is preferably around 5 mm. The threads 46 create a swirling airflow in the outlet portion 30, as indicated in the bottom part of FIG. 6. This may create a pleasant usage experience for a user inhaling the swirling aerosol at the downstream end 32 of the venturi element 12.

Figure 7:
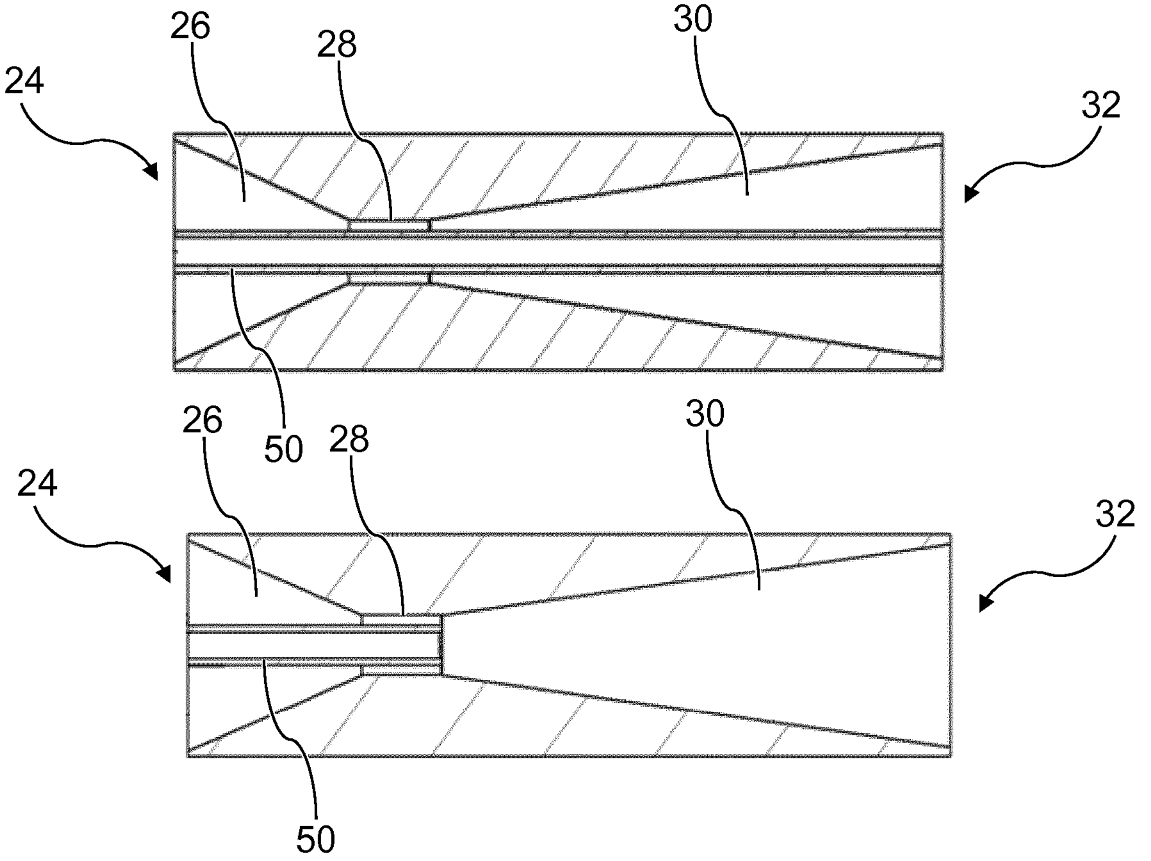
FIG. 7 shows two embodiments of the venturi element with a central axial tube.

FIG. 7 shows an embodiment, in which a central axial tube 50 is provided along the longitudinal axis of the venturi element 12. The central axial tube 50 provides a second airflow path. Air flows in a laminar flow towards the mouth of a user through the central axial tube 50. In addition to this central airflow through the central axial tube 50, air may flow around the central axial tube 50 for aerosol generation. The air flowing around the central axial tube 50 may flow in a turbulent flow. The air flowing around the central axial tube 50 flows through the constricted part of the central portion 28 and into the outlet portion 30, in which the air may expand. Thus, optimized droplets may be generated in the outlet portion 30 around the central axial tube 50 and merge with the aerosol flowing through the central axial tube 50 downstream of the venturi element 12 into the mouth of the user. This arrangement may lead to a pleasant sensorial usage experience of a user. The top part of FIG. 7 shows an embodiment, in which the central axial tube 50 extends all the way through the length of the venturi element 12. The bottom part of FIG. 7 shows an embodiment, in which the central axial tube 50 extends through the inlet portion 26 as well as the central portion 28 of the venturi element 12 and not through the outlet portion 30. In another embodiment not illustrated, the central axial tube 50 may extend through only the outlet portion 30. In another embodiment, the central axial tube 50 may extend through only the central portion 28 and the outlet portion 30, but not through the inlet portion 26.

Figure 8:
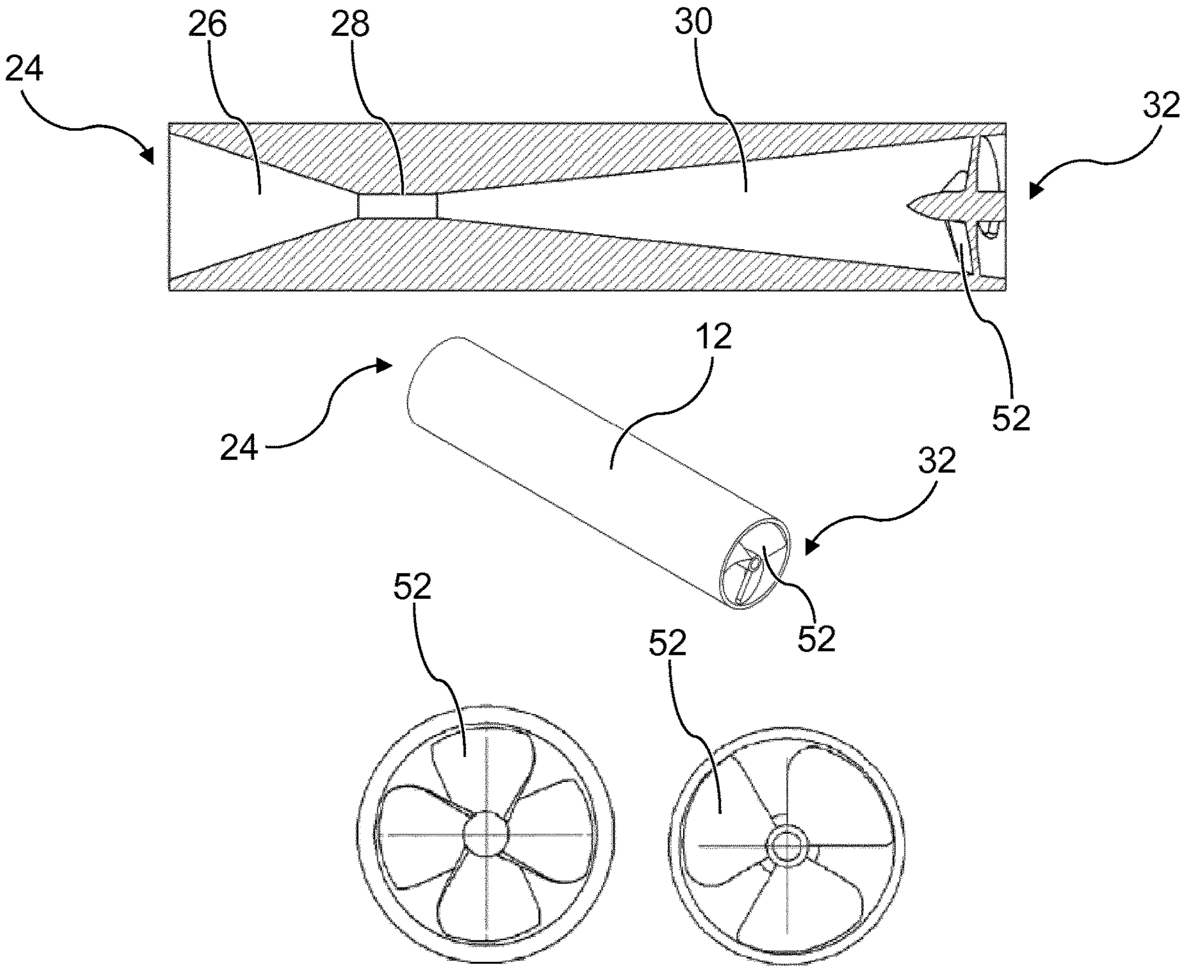
FIG. 8 shows various views of an embodiment of the venturi element with a propeller.

FIG. 8 shows a configuration, in which a propeller 52 is provided in the outlet portion 30 of the venturi element 12. The propeller 52 creates a swirling aerosol airflow downstream of the venturi element 12 into the mouth of user. The propeller 52 is therefore arranged adjacent to the downstream end 32 of the venturi element 12. The propeller 52 may comprise multiple blades. Embodiments with three or four blades are shown in the bottom part of FIG. 8. A configuration with three blades is particularly preferred, however it will be appreciated that more than three or even more than four blades may be used within the scope of the invention.

Figure 9:
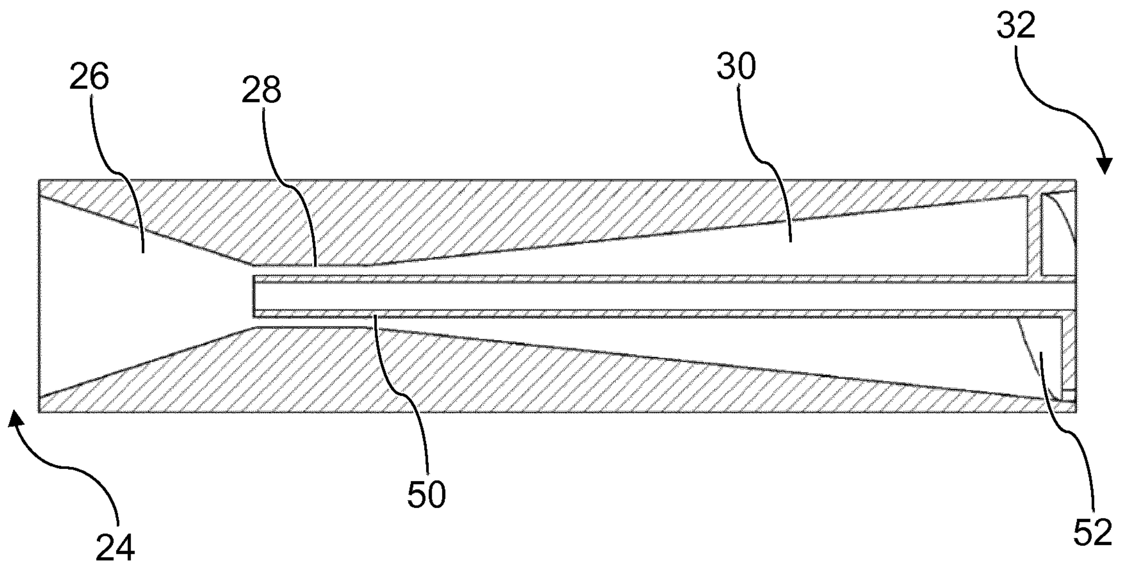
FIG. 9 shows an embodiment of the venturi element with a combination of a central axial tube and a propeller.

FIG. 9 shows an embodiment, in which the embodiments of FIGS. 7 and 8 are combined. In more detail, a central axial tube 50 is provided together with a propeller 52 surrounding the central axial tube 50. The propeller 52 is arranged adjacent to the downstream end 32 of the venturi element 12. Around the central axial tube 50 and the outlet portion 30 of the venturi element 12, optimized droplets are created and the airflow of the aerosol is further optimized by the propeller 52. This airflow merges with the air coming from the central axial tube 50 into the mouth of a user for a pleasant usage experience.

Figure 10:
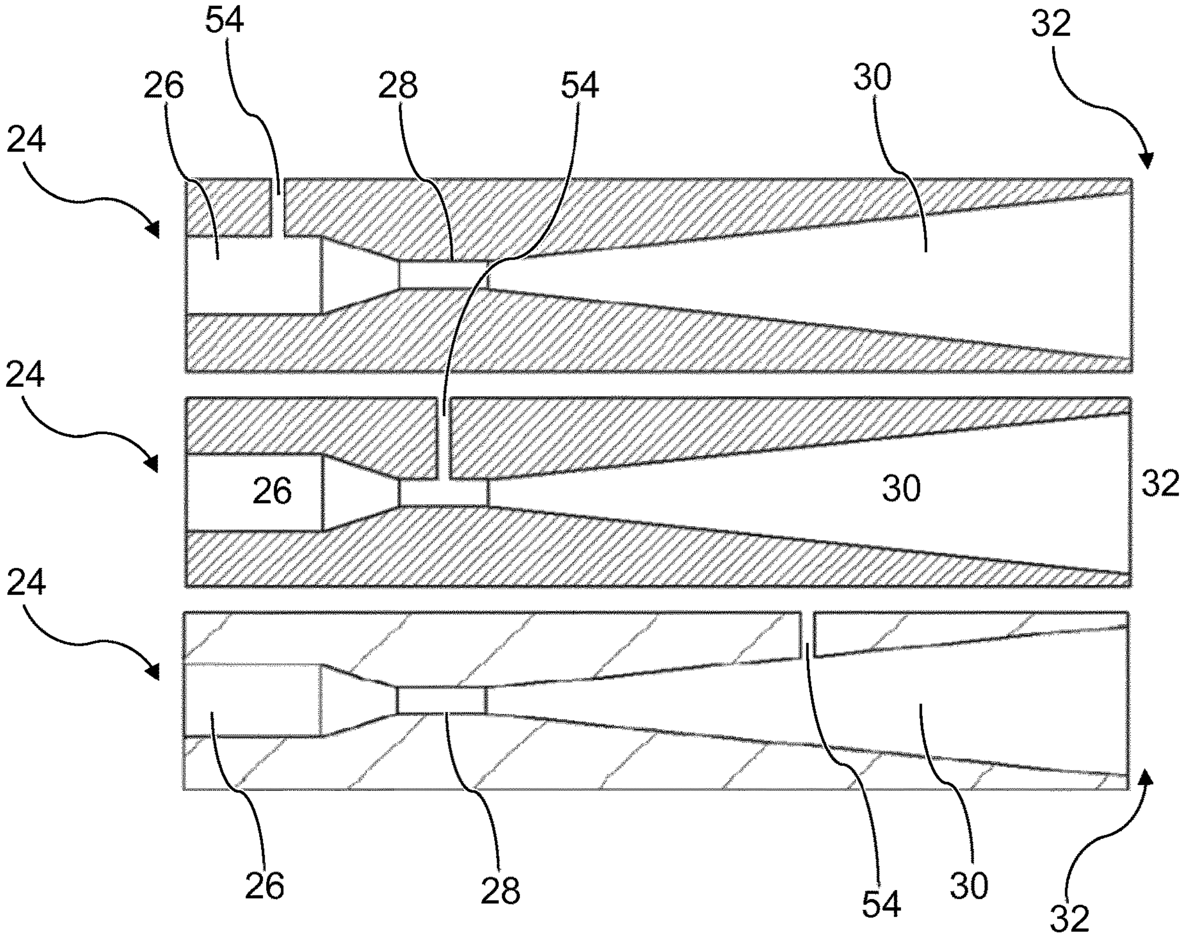
FIG. 10 shows various embodiments of the venturi element with a ventilation hole in various different locations along the venturi element.

FIG. 10 shows an embodiment, in which a ventilation hole 54 is provided. The top part of FIG. 10 shows an embodiment, in which the ventilation hole 54 is provided in the inlet portion 26 of the venturi element 12. In all embodiments shown in FIG. 10, the ventilation hole 54 enables air to flow from outside of the venturi element 12 into the airflow channel through the venturi element 12. The middle part of FIG. 10 shows an embodiment, in which the ventilation hole 54 is arranged in the central portion 28, while the bottom part of FIG. 10 shows an embodiment, in which the ventilation hole 54 is arranged in the outlet portion 30 of the venturi element 12. The middle part of FIG. 10 shows a preferred embodiment, since the air pressure in the central portion 28 of the venturi element 12 is reduced when air flows through the venturi element 12. In this regard, the venturi effect leads to reduced pressure and increased velocity in the central portion 28 of the venturi element 12, since this central portion 28 is a constricted airflow passage in comparison to the inlet portion 26 and the outlet portion 30 of the venturi element 12. Hence, air may be sucked from the outside of the venturi element 12 through the ventilation hole 54 into the central portion 28. This outside air may then merge with the air flowing through the venturi element 12 from the upstream end 24 of the venturi element 12 towards the downstream end 32 of the venturi element 12. This may lead to a pleasant usage experience.

Figure 11:
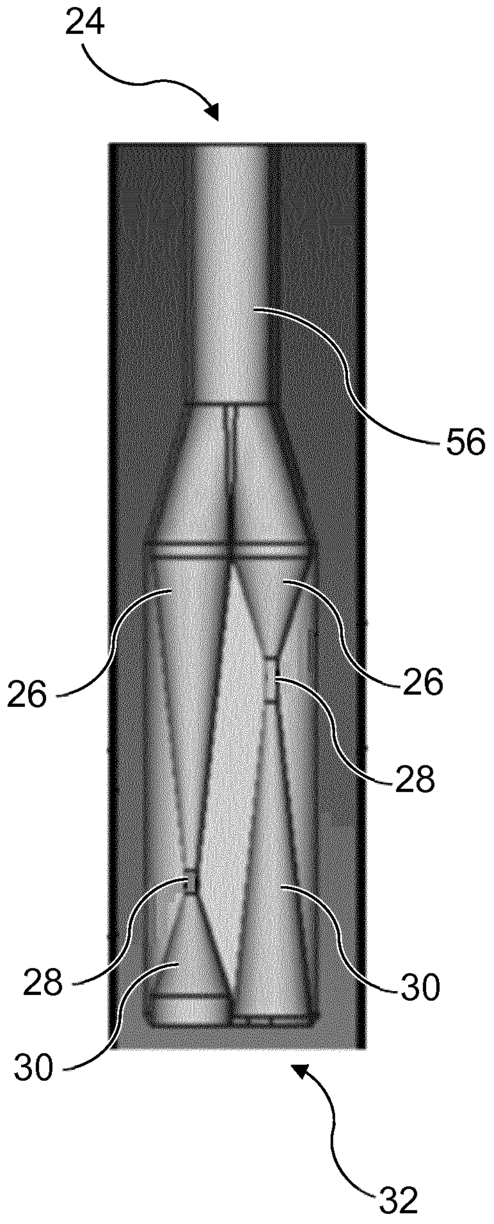
FIG. 11 shows an embodiment of the venturi element with two airflow channels.

FIG. 11 shows an embodiment of the venturi element 12 with two airflow channels. The airflow channel shown in the right part of the embodiment shown in FIG. 11 essentially corresponds to the airflow channel described above with regard to the venturi element 12 used in conjunction with the aerosol-generating article comprising aerosol-forming substrate, preferably non-liquid aerosol-forming substrate. In this airflow channel, the inlet portion 26 is relatively short in comparison to the outlet portion 30. In this airflow channel, the inlet angle $\alpha$ is relatively larger than the outlet angle $\theta$. In addition to this airflow channel, the second airflow channel, provided on the left of the first airflow channel in the embodiment shown in FIG. 11, has a flipped configuration. This means that the second airflow channel essentially corresponds to the first airflow channel, if the first airflow channel would be arranged reversed. In this reversed airflow channel, the outlet portion 30 is relatively short in comparison to the inlet portion 36. In this reversed airflow channel, the inlet angle $\alpha$ is relatively smaller than the outlet angle $\theta$. The airflow channel shown in the left part of the embodiment shown in FIG. 11 essentially corresponds to the airflow channel described above with regard to the venturi element 12 used in conjunction with the aerosol-generating article comprising liquid aerosol-forming substrate. In this airflow channel, the inlet portion 26 is relatively large in comparison to the outlet portion 30. In this airflow channel, the inlet angle α is relatively smaller than the outlet angle θ. In addition to this airflow channel, the second airflow channel, provided on the right of the first airflow channel in the embodiment shown in FIG. 11, has a flipped configuration. This means that the second airflow channel essentially corresponds to the first airflow channel, if the first airflow channel would be arranged reversed. In this reversed airflow channel, the outlet portion 30 is relatively large in comparison to the inlet portion 36. In this reversed airflow channel, the inlet angle α is relatively larger than the outlet angle θ. This arrangement of the airflow channels may create an optimized usage experience, since the two airflow channels may create slightly different experiences. One of the airflow channels may create a smooth usage experience, while the other airflow channel may create a kick or a stronger delivery profile. In combination, a desired delivery profile may be combined with a smooth usage experience. For distributing the air between the first airflow channel and the second airflow channel, a common upstream portion 56 may be provided in the venturi element 12.

Figure 12:
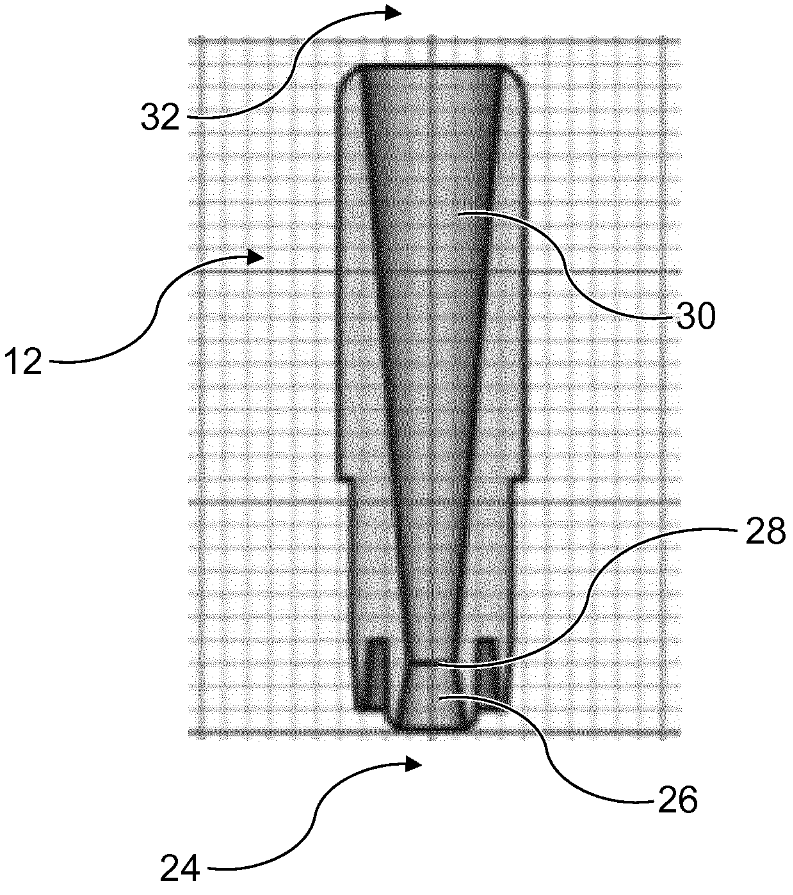
FIG. 12 shows an embodiment of the venturi element with a central portion of negligible length.

FIG. 12 shows a preferred embodiment, in which the central portion 28 is configured as the transition between the inlet portion 26 and the outlet portion 30. The central portion 28 of the embodiment depicted in FIG. 12 constitutes a constricted airflow passage and thus leads to the venturi effect when air flows from the inlet portion 26 to the outlet portion 28.

The invention claimed is:

1. An aerosol-generating system, comprising:

an aerosol-forming substrate; and a venturi element comprising an airflow channel, wherein the airflow channel comprises an inlet portion, a central portion, and an outlet portion, wherein the inlet portion is configured converging towards the central portion with an inlet angle of between 1° and 19°, and wherein the outlet portion is configured diverging from the central portion.

2. The aerosol-generating system according to claim 1, further comprising an aerosol-generating article comprising the aerosol-forming substrate.

3. The aerosol-generating system according to claim 2, wherein the aerosol-generating article comprises the venturi element.

4. The aerosol-generating system according to claim 2, wherein the venturi element is configured to be removably attachable to the aerosol-generating article.

5. The aerosol-generating system according to claim 4, wherein the aerosol-generating article further comprises a connection portion, wherein the venturi element comprises an airflow channel comprising an inlet portion, wherein the inlet portion of the venturi element comprises a connection element, and wherein the connection portion of the aerosol-generating article is configured to removably receive the connection element of the venturi element.

6. The aerosol-generating system according to claim 5, wherein the connection portion of the aerosol-generating article has a substantially tubular shape configured for insertion of the connection element of the venturi element therein.

7. The aerosol-generating system according to claim 5, wherein the connection element of the venturi element comprises mechanical retaining means configured for retaining the connection element of the venturi element within the connection portion of the aerosol-generating article.

8. The aerosol-generating system according to claim 1, wherein the venturi element is configured as a mouthpiece.

9. The aerosol-generating system according to claim 2, wherein the aerosol-generating article is configured rod shaped, and wherein a wrapping material is arranged wrapping the aerosol-generating article.

10. The aerosol-generating system according to claim 1, wherein the inlet portion is configured converging towards the central portion with an inlet angle of between 16° and 19°.

11. The aerosol-generating system according to claim 1, wherein the outlet portion is diverging from the central portion with an outlet angle of between 2° and 10°.

12. The aerosol-generating system according to claim 1, wherein one or more of:

an axial length of the inlet portion is between 3 mm and 10 mm, an axial length of the outlet portion is between 14 mm and 35 mm, an axial length of the central portion is between 2 mm and 5 mm, an inner diameter of the central portion is between 0.5 mm and 1.5 mm.

13. The aerosol-generating system according to claim 1, wherein the aerosol-forming substrate comprises a non-liquid aerosol-forming substrate.

14. The aerosol-generating system according to claim 13, wherein the non-liquid aerosol-forming substrate is an Electrically Heatable Tobacco Product (EHTP).

15. The aerosol-generating system according to claim 1, wherein the inlet portion is configured converging towards the central portion with an inlet angle of between 2° and 10°.

16. The aerosol-generating system according to claim 15, wherein the aerosol-forming substrate is a liquid aerosol-forming substrate.

17. The aerosol-generating system according to claim 15, wherein the inlet portion is configured converging towards the central portion with an inlet angle of between 4° and 8°.

18. The aerosol-generating system according to claim 15, wherein the outlet portion is diverging from the central portion with an outlet angle of between 10° and 20°.

19. The aerosol-generating system according to claim 15, wherein one or more of:

an axial length of the inlet portion is between 14 mm and 35 mm, an axial length of the outlet portion is between 3 mm and 10 mm, an axial length of the central portion is between 2 mm and 5 mm, an inner diameter of the central portion is between 0.5 mm and 5 mm.

20. The aerosol-generating system according to claim 1, wherein one or more of:

the outlet portion comprises threads, the venturi element further comprises a central axial tube having a relatively smaller outer diameter than a diameter of the central portion, the venturi element further comprises a propeller at or downstream of the outlet portion, the venturi element further comprises a ventilation hole, the venturi element further comprises a second airflow channel parallel to the first airflow channel, the second airflow channel comprising a second inlet portion, a second central portion, and a second outlet portion, wherein the second inlet portion is configured converging towards the second central portion and the second outlet portion is configured diverging from the second central portion.

21. The aerosol-generating system according to claim 1, further comprising an aerosol-generating device comprising a cavity configured to receive the aerosol-forming substrate therein, wherein the aerosol-generating device is configured to heat the received aerosol-forming substrate to a temperature at which one or more volatile compounds are released from the aerosol-forming substrate, substantially without combusting the aerosol-forming substrate.

22. The aerosol-generating system according to claim 21, wherein the aerosol-generating device further comprises a heating element, and wherein the heating element is arranged to at least partially penetrate an internal portion of the aerosol-forming substrate.

23. The aerosol-generating system according to claim 21, further comprising a heating element, wherein the heating element is arranged to heat at least an external surface of the aerosol-forming substrate or of an article comprising the aerosol-forming substrate.

24. The aerosol-generating system according to claim 21, wherein the venturi element is part of the aerosol-generating device.

25. The aerosol-generating system according to claim 2 and a kit of venturi elements for the aerosol-generating system, the kit comprising at least one venturi element and at least one different venturi element, wherein each venturi element is configured to be removably attachable to one or both of:

the aerosol-generating article comprising aerosol-forming substrate, and the aerosol-generating device, wherein said each venturi element is configured with different characteristics, being one or both of physical properties and mechanical properties of the venturi elements, wherein said each venturi element is configured with different characteristics by means of different outlet angles, wherein the outlet angles of said each of the venturi elements differ by at least 0.5°, and/or wherein said each venturi element is configured with different characteristics by means of different inlet angles, wherein the inlet angles of each of the venturi elements differ by at least 0.5°.

26. The aerosol-generating system and kit of venturi elements according to claim 25, wherein one or more venturi element comprises at least one of:

threads at the outlet portion, a central axial tube having a relatively smaller outer diameter than a diameter of the central portion, a propeller at or downstream of the outlet portion, a ventilation hole, and a second airflow channel parallel to the first airflow channel, the one or more venturi element comprising a second inlet portion, a second central portion, and a second outlet portion, wherein the second inlet portion is configured converging towards the second central portion and the second outlet portion is configured diverging from the second central portion.

* * * * *